(12) United States Patent
Heap et al.

(10) Patent No.: US 8,285,431 B2
(45) Date of Patent: Oct. 9, 2012

(54) OPTIMAL SELECTION OF HYBRID RANGE STATE AND/OR INPUT SPEED WITH A BLENDED BRAKING SYSTEM IN A HYBRID ELECTRIC VEHICLE

(75) Inventors: Anthony H. Heap, Ann Arbor, MI (US); Kee Yong Kim, Ann Arbor, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1052 days.

(21) Appl. No.: 12/234,639

(22) Filed: Sep. 20, 2008

(65) Prior Publication Data

US 2009/0118920 A1 May 7, 2009

Related U.S. Application Data

(60) Provisional application No. 60/985,228, filed on Nov. 3, 2007.

(51) Int. Cl.
*B60L 11/00* (2006.01)
*B60K 6/20* (2007.10)

(52) U.S. Cl. ............................ 701/22; 180/65.21
(58) Field of Classification Search .................. 701/22, 701/35, 208, 211, 213, 300, 83, 84, 70, 490; 180/65.1–65.8; 340/995.1, 995.19; 903/930
See application file for complete search history.

(56) References Cited

U.S. PATENT DOCUMENTS

| | | | |
|---|---|---|---|
| 6,506,140 B1 * | 1/2003 | O'Neil et al. ................... 477/62 |
| 6,645,106 B2 * | 11/2003 | Goo ................................ 475/72 |
| 6,645,140 B2 * | 11/2003 | Brommersma ............... 600/128 |
| 6,832,148 B1 | 12/2004 | Bennett |
| 6,868,318 B1 | 3/2005 | Cawthorne |
| 7,154,236 B1 | 12/2006 | Heap |
| 2003/0216217 A1 * | 11/2003 | Schreiber et al. ............... 477/44 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |

(Continued)

*Primary Examiner* — James Trammell
*Assistant Examiner* — Muhammad Shafi

(57) ABSTRACT

A method for operating a vehicle includes determining a transmission input speed, operating the transmission using the transmission input speed, and providing a braking torque request to cause braking of the vehicle according to a scheme selected from the group consisting of a first braking mode and a second braking mode. The transmission input speed and the transmission operating range state are dependent on said braking torque request in the first braking mode, and wherein the transmission operating state, but not the transmission input speed, is dependent on the braking torque request in the second braking mode.

14 Claims, 18 Drawing Sheets

U.S. PATENT DOCUMENTS

| | | |
|---|---|---|
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0213909 A1 | 9/2007 | Doering et al. |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0005924 A1* | 1/2009 | Hasegawa et al. ............ 701/22 |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |

| | | | | | |
|---|---|---|---|---|---|
| 2009/0118932 A1 | 5/2009 | Heap | 2009/0118948 A1 | 5/2009 | Heap |
| 2009/0118933 A1 | 5/2009 | Heap | 2009/0118949 A1 | 5/2009 | Heap |
| 2009/0118934 A1 | 5/2009 | Heap | 2009/0118950 A1 | 5/2009 | Heap |
| 2009/0118935 A1 | 5/2009 | Heap | 2009/0118951 A1 | 5/2009 | Heap |
| 2009/0118936 A1 | 5/2009 | Heap | 2009/0118952 A1 | 5/2009 | Heap |
| 2009/0118937 A1 | 5/2009 | Heap | 2009/0118954 A1 | 5/2009 | Wu |
| 2009/0118938 A1 | 5/2009 | Heap | 2009/0118957 A1 | 5/2009 | Heap |
| 2009/0118939 A1 | 5/2009 | Heap | 2009/0118962 A1 | 5/2009 | Heap |
| 2009/0118940 A1 | 5/2009 | Heap | 2009/0118963 A1 | 5/2009 | Heap |
| 2009/0118941 A1 | 5/2009 | Heap | 2009/0118964 A1 | 5/2009 | Snyder |
| 2009/0118942 A1 | 5/2009 | Hsieh | 2009/0118969 A1 | 5/2009 | Heap |
| 2009/0118943 A1 | 5/2009 | Heap | 2009/0118971 A1 | 5/2009 | Heap |
| 2009/0118944 A1 | 5/2009 | Heap | 2009/0118999 A1 | 5/2009 | Heap |
| 2009/0118945 A1 | 5/2009 | Heap | 2009/0144002 A1 | 6/2009 | Zettel |
| 2009/0118946 A1 | 5/2009 | Heap | | | |
| 2009/0118947 A1 | 5/2009 | Heap | | | |

\* cited by examiner

OPTIMAL SELECTION OF HYBRID RANGE STATE AND/OR INPUT SPEED WITH A BLENDED BRAKING SYSTEM IN A HYBRID ELECTRIC VEHICLE

CROSS-REFERENCES TO RELATED APPLICATIONS

This application claims the benefit of U.S. Provisional Application No. 60/985,228 filed on Nov. 3, 2007, which is hereby incorporated herein by reference.

TECHNICAL FIELD

This disclosure relates generally to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A motorized vehicle has a powertrain system that includes an engine coupled to an electro-mechanical transmission selectively operative in one of a plurality of transmission operating range states and one of a plurality of engine states, an accelerator control, and an electrical energy storage device. A method for operating the vehicle includes determining a transmission input speed, operating the transmission using the transmission input speed, and providing a braking torque request to cause braking of the vehicle according to a scheme selected from the group consisting of a first braking mode and a second braking mode. The transmission input speed and the transmission operating range state are dependent on said braking torque request in the first braking mode, and wherein the transmission operating state, but not the transmission input speed, is dependent on the braking torque request in the second braking mode.

BRIEF DESCRIPTION OF THE DRAWINGS

One or more embodiments will now be described, by way of example, with reference to the accompanying drawings, in which.

DETAILED DESCRIPTION

Figure 1:
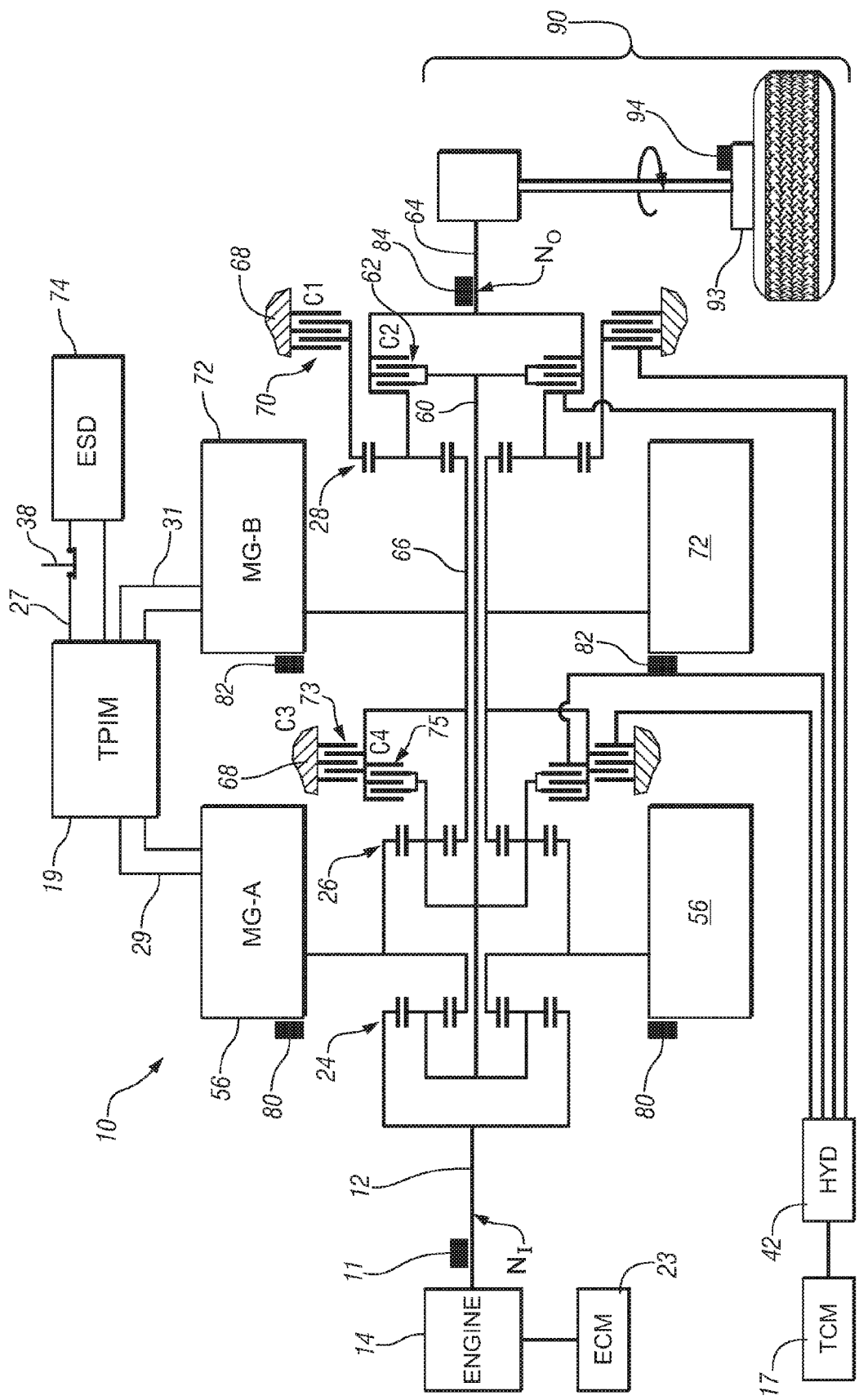
FIG. 1 is a schematic diagram of an exemplary powertrain, in accordance with the present disclosure.

Referring now to the drawings, wherein the showings are for the purpose of illustrating certain exemplary embodiments only and not for the purpose of limiting the same, FIG. 1 shows an exemplary electro-mechanical hybrid powertrain. The exemplary electro-mechanical hybrid powertrain shown in FIG. 1 comprises a two-mode, compound-split, electro-mechanical hybrid transmission 10 operatively connected to an engine 14, and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

In one embodiment, the exemplary engine 14 comprises a multi-cylinder internal combustion engine which is selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 is preferably present to monitor rotational speed of the input shaft 12. Power output from the engine 14, comprising rotational speed and output torque, can differ from the input speed, $N_I$, and the input torque, $T_I$, to the transmission 10 due to torque-consuming components being present on or in operative mechanical contact with the input shaft 12 between the engine 14 and the transmission 10, e.g., a hydraulic pump (not shown) and/or a torque management device (not shown).

In one embodiment the exemplary transmission 10 comprises three planetary-gear sets 24, 26 and 28, and four selectively-engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. In one embodiment, clutches C2 62 and C4 75 preferably comprise hydraulically-applied rotating friction clutches. In one embodiment, clutches C1 70 and C3 73 preferably comprise hydraulically-controlled stationary devices that can be selectively grounded to a transmission case 68. In a preferred embodiment, each of the clutches C1 70, C2 62, C3 73, and C4 75 is preferably hydraulically applied, selectively receiving pressurized hydraulic fluid via the hydraulic control circuit 42.

In one embodiment, the first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with commands provided to the TPIM which derive from such factors as including operator torque requests, current operating conditions and states, and such commands determine whether the ESD 74 is being charged, discharged or is in stasis at any given instant.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31, depending on commands received which are typically based on factors which include current operating state and operator torque demand.

Figure 2:
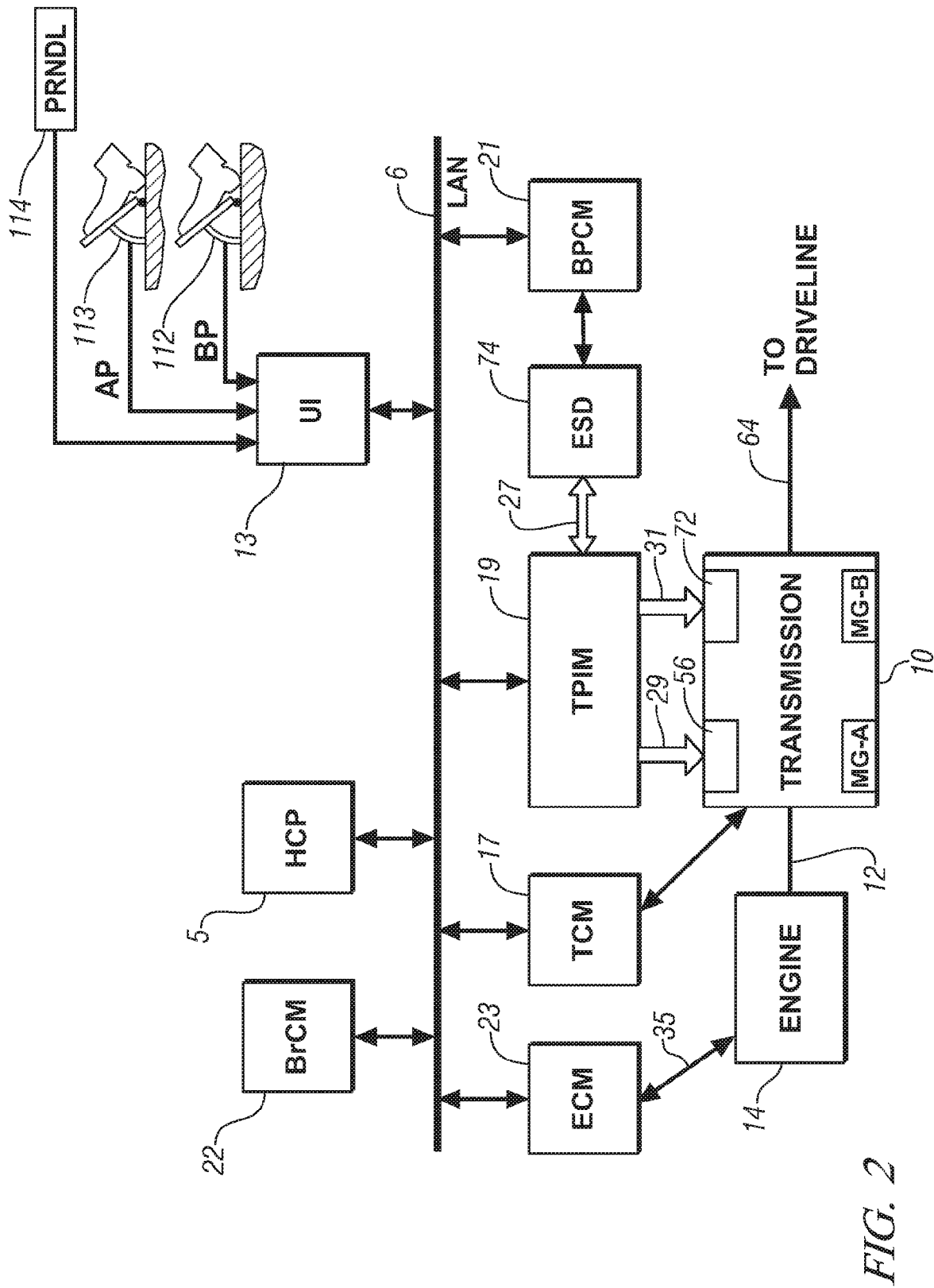
FIG. 2 is a schematic diagram of an exemplary architecture for a control system and powertrain, in accordance with the present disclosure.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator may selectively control or direct operation of the electro-mechanical hybrid powertrain. The devices present in UI 13 typically include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters which may include without limitation: a manifold pressure, engine coolant temperature, throttle position, ambient air temperature, and ambient pressure. The engine load can be determined, for example, from the manifold pressure, or alternatively, from monitoring operator input to the accelerator pedal 113. The ECM 23 generates and communicates command signals to control engine actuators, which may include without limitation actuators such as: fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are preferably executed at regular intervals, for example at each 3.125, 6.25, 12.5, 25 and 100 milliseconds during ongoing operation of the powertrain. However, any interval between about 2 milliseconds and about 300 milliseconds may be selected. Alternatively, algorithms may be executed in response to the occurrence of any selected event.

The exemplary powertrain shown in reference to FIG. 1 is capable of selectively operating in any of several operating range states that can be described in terms of an engine state comprising one of an engine on state ('ON') and an engine off state ('OFF'), and a transmission state comprising a plurality of fixed gears and continuously variable operating modes, described with reference to Table I, below.

TABLE I

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. As an example, a first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. For example, a first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Resultant vehicle acceleration is affected by other factors including, e.g., road load, road grade, and vehicle mass. The operating range state is determined for the transmission 10 based upon inputs which include a variety of operating characteristics of the powertrain. These include the operator torque request communicated through the accelerator pedal 113 and brake pedal 112 to the user interface 13.

In some embodiments, the operating range state may be predicated on a powertrain torque demand caused by a command to operate the first and second electric machines 56 and 72 in an electrical energy generating mode or in a torque generating mode. In some embodiments, the operating range state can be determined by an optimization algorithm or routine which determines a preferential selection of the operating range state based upon inputs which may include: operator demand for power; battery state-of-charge; and operating efficiencies of the engine 14 and the first and second electric machines 56, 72. The control system manages torque inputs from the engine 14 and the first and second electric machines 56 and 72 based upon pre-selected outcome criteria embedded in the executed selection routine, and system operation is controlled thereby to effectively manage resources commensurate with desired levels of ESD state-of-charge and fuel delivery. Moreover, operation can be determined, including over-riding of any desired feature(s), based upon detection of a fault in one or more components or sub-systems. The HCP 5 monitors the torque-generative devices, and determines the power output from the transmission 10 required to achieve the output torque necessary to meet the operator torque request. The ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Given various operating conditions possible for a motorized vehicle equipped with an electro-mechanical hybrid transmission, which include varied environmental and road conditions such as road grade and operator torque demands, it is generally possible for an electro-mechanical hybrid transmission to be usefully operatively engaged potentially in more than one operating range state, including such range states specified in Table I, at a given time during its operation. Moreover, it may be true that for every change in road grade, throttle opening, and brake pedal depression that a motorized vehicle comprising an electro-mechanical hybrid transmission experiences during the course of its typical travel, differing operating range states of the transmission and engine states of the engine may at any time be viewed as being advantageous in consideration of an overall balance between such factors including fuel economy, required torque output of the transmission, and state of charge of the ESD 74. At any one instant in time, a particular transmission operating range state and engine state may be desirable, advantageous or preferred, while at subsequent instants in time other transmission operating range states and engine states may be desirable, advantageous or preferred, with the result being that over even a relatively short time span of operation such as, for example, five minutes, conditions making dozens or more desirable, advantageous, or preferred transmission operating range states and engine states exist during such time span. However, this disclosure provides that altering the transmission operating range state and engine states in response to each and every single change in operating conditions encountered is not necessarily desirable in a motorized vehicle having an electro-mechanical hybrid transmission.

Figure 3:
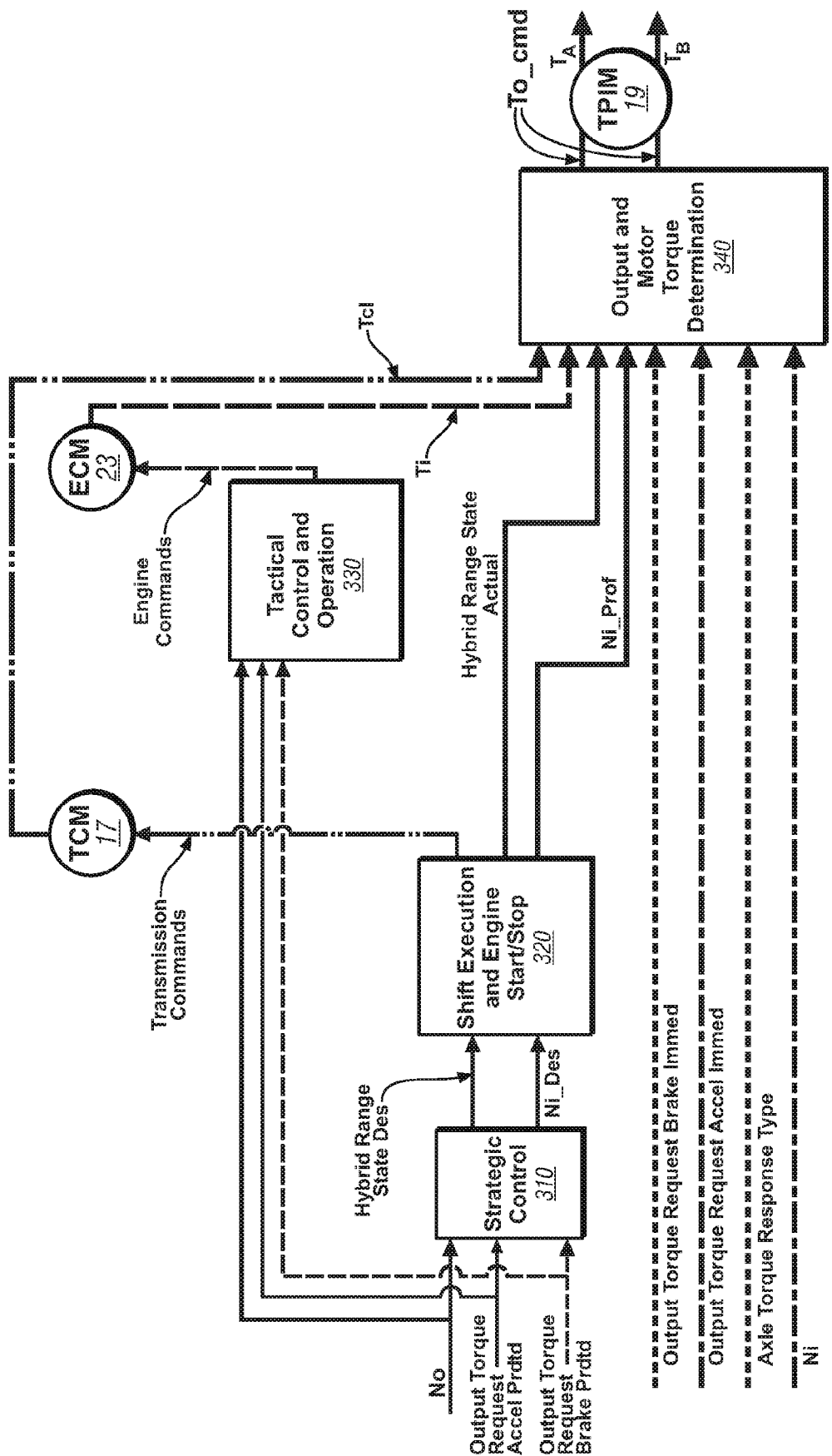
FIGS. 3-8 are schematic flow diagrams of various aspects of a control scheme, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque-generative machines and energy storage systems, e.g., hydraulic-mechanical hybrid transmissions (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No'). The immediate accelerator output torque request is determined based upon a presently occurring operator input to the accelerator pedal 113, and comprises a request to generate an immediate output torque at the output member 64 preferably to accelerate the vehicle. The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. When commanded by the operator, there can be operating conditions under which the predicted brake output torque request is set to zero, e.g., when the operator setting to the transmission gear selector 114 is set to a reverse gear, and when a transfer case (not shown) is set to a four-wheel drive low range.

A strategic control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic control scheme 310. The strategic control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and the present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figure 4:
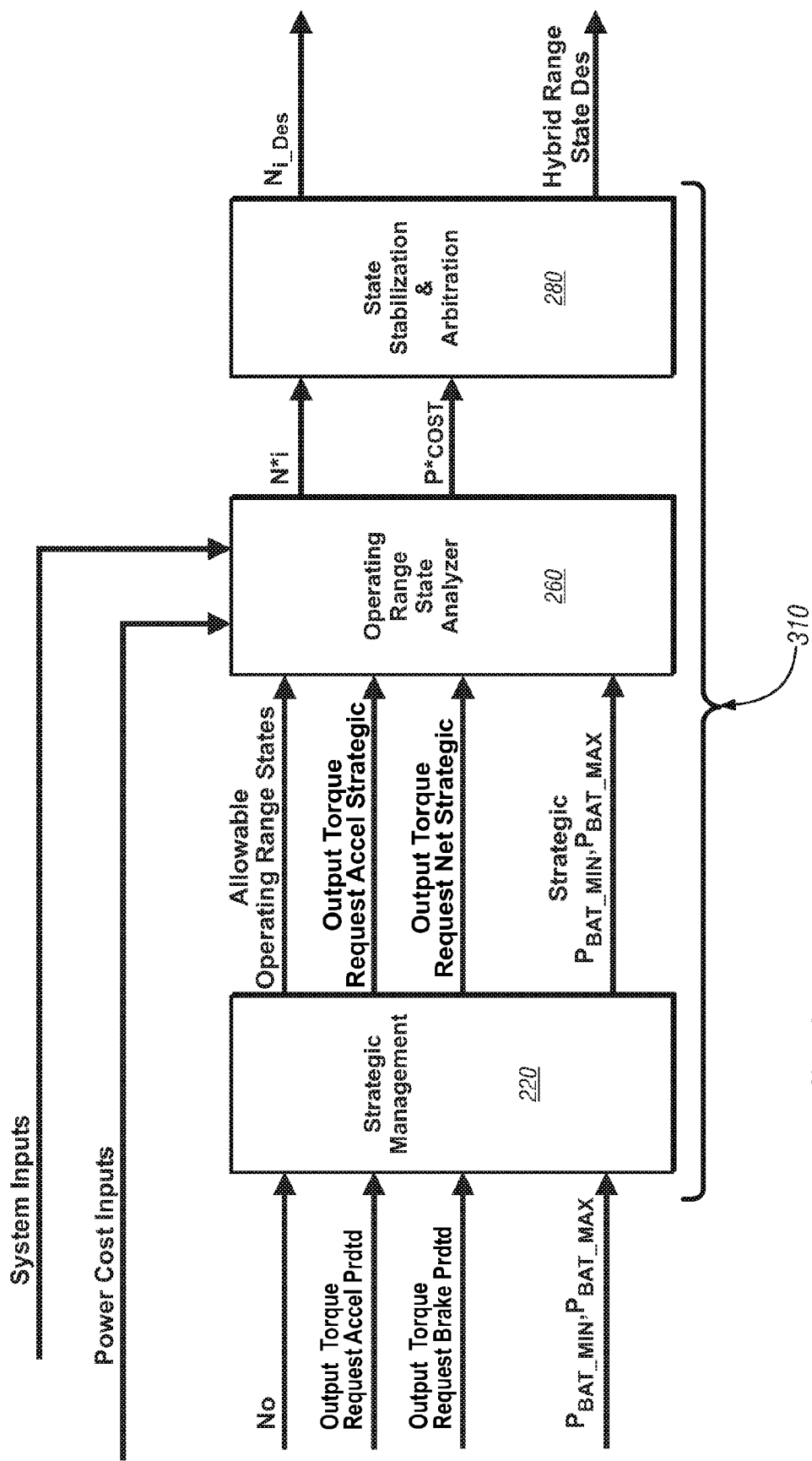
Figure 5:
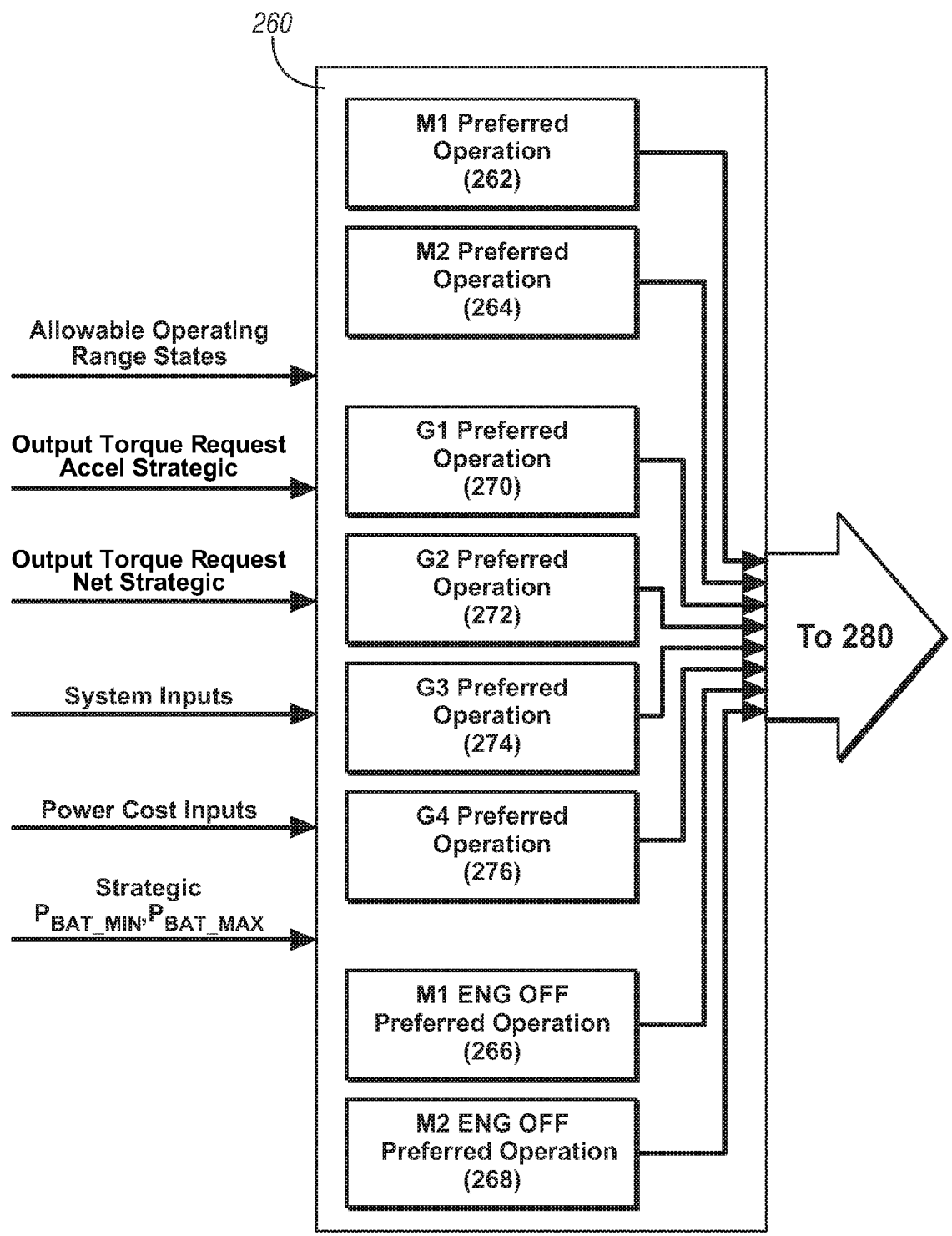

FIG. 4 details signal flow in the strategic optimization control scheme 310, which includes a strategic manager 220, an operating range state analyzer 260, and a state stabilization and arbitration block 280 to determine the preferred input speed ('Ni_Des') and the preferred transmission operating range state ('Hybrid Range State Des'). The strategic manager ('Strategic Manager') 220 monitors the output speed No, the predicted accelerator output torque request ('Output Torque Request Accel Prdtd'), the predicted brake output torque request ('Output Torque Request Brake Prdtd'), and available battery power $P_{BAT\_MIN}$ to $P_{BAT\_MAX}$. The strategic manager 220 determines which of the transmission operating range states are allowable, and determines output torque requests comprising a strategic accelerator output torque request ('Output Torque Request Accel Strategic') and a strategic net output torque request ('Output Torque Request Net Strategic'), all of which are input the operating range state analyzer 260 along with system inputs ('System Inputs') and power cost inputs ('Power Cost Inputs'), and any associated penalty costs ('Penalty Costs') for operating outside of predetermined limits. The operating range state analyzer 260 generates a preferred power cost ('P*cost') and associated input speed ('N*i') for each of the allowable operating range states based upon the operator torque requests, the system inputs, the available battery power and the power cost inputs. The preferred power costs and associated input speeds for the allowable operating range states are input to the state stabilization and arbitration block 280 which selects the preferred operating range state and preferred input speed based thereon. The operating range state analyzer 260 executes searches in each candidate operating range state comprising the allowable ones of the operating range states, including M1 (262), M2 (264), G1 (270), G2 (272), G3 (274), and G4 (276) to determine preferred operation of the torque actuators, i.e., the engine 14 and the first and second electric machines 56 and 72 in this embodiment. The preferred operation preferably comprises a minimum power cost for operating the hybrid powertrain system and an associated engine input for operating in the candidate operating range state in response to the operator torque request. The associated engine input comprises at least one of a preferred engine input speed ('Ni*'), a preferred engine input power ('Pi*'), and a preferred engine input torque ('Ti*') that is responsive to and preferably meets the operator torque request. The operating range state analyzer 260 evaluates M1-Engine-off (264) and M2-Engine-off (266) to determine a preferred cost ('P*cost') for operating the powertrain system responsive to and preferably meeting the operator torque request when the engine 14 is in the engine-off state.

Figure 6:
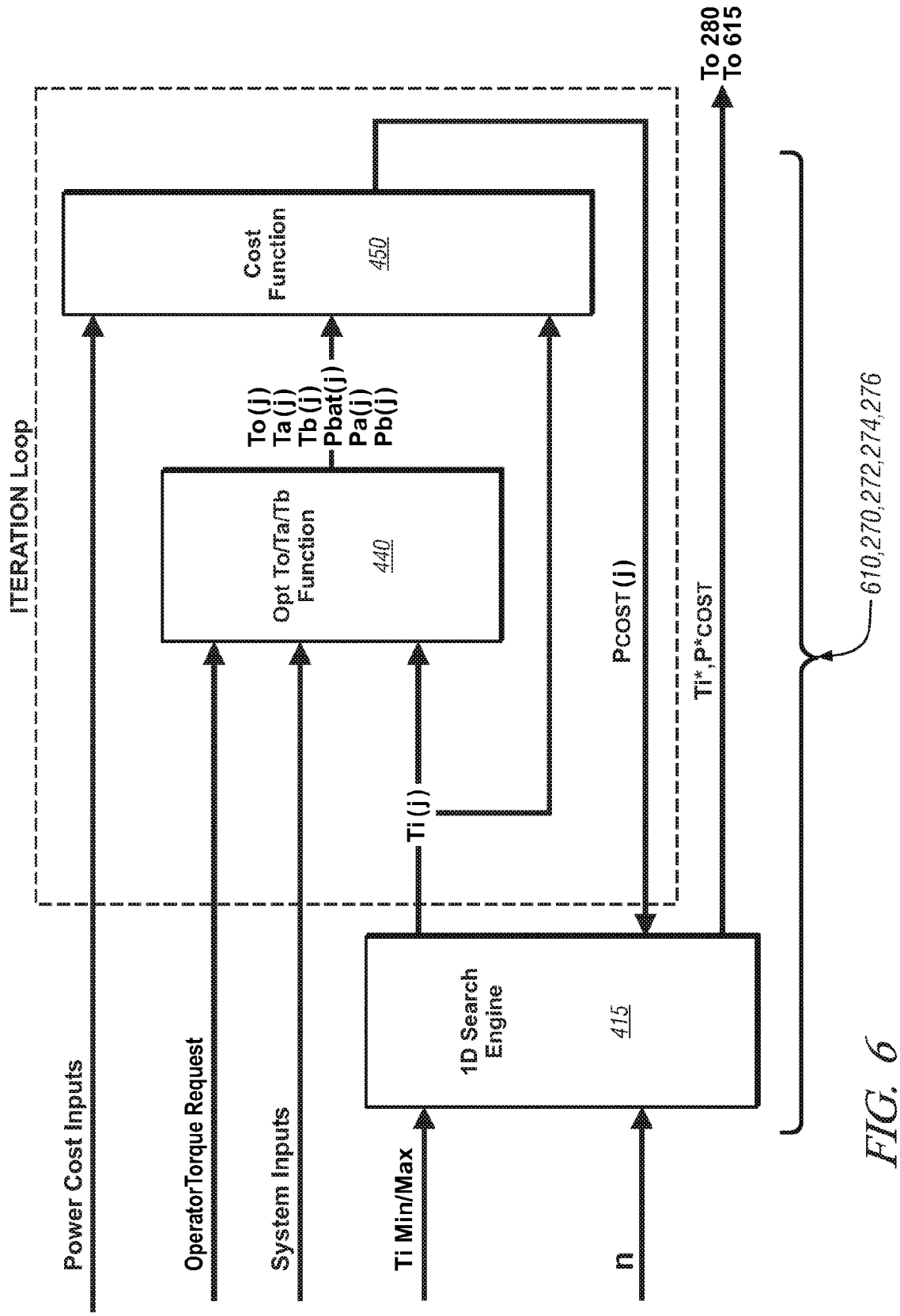

FIG. 6 schematically shows signal flow for the 1-dimension search scheme 610. A range of one controllable input, in this embodiment comprising minimum and maximum input torques ('TiMin/Max'), is input to a 1-D search engine 415. The 1-D search engine 415 iteratively generates candidate input torques ('Ti(j)') which range between the minimum and maximum input torques, each which is input to an optimization function ('Opt To/Ta/Tb') 440, for n search iterations. Other inputs to the optimization function 440 include system inputs preferably comprise parametric states for battery power, clutch torques, electric motor operation, transmission and engine operation, the specific operating range state and the operator torque request. The optimization function 440 determines transmission operation comprising an output torque, motor torques, and associated battery powers ('To(j), Ta(j), Tb(j), Pbat(j), Pa(j), Pb(j)') associated with the candidate input torque based upon the system inputs in response to the operator torque request for the candidate operating range state. The output torque, motor torques, and associated battery powers and power cost inputs are input to a cost function 450, which executes to determine a power cost ('Pcost(j)') for operating the powertrain in the candidate operating range state at the candidate input torque in response to the operator torque request. The 1-D search engine 415 iteratively generates candidate input torques over the range of input torques and determines the power costs associated therewith to identify a preferred input torque ('Ti*') and associated preferred cost ('P*cost'). The preferred input torque ('Ti*') comprises the candidate input torque within the range of input torques that results in a minimum power cost of the candidate operating range state, i.e., the preferred cost.

Figure 7:
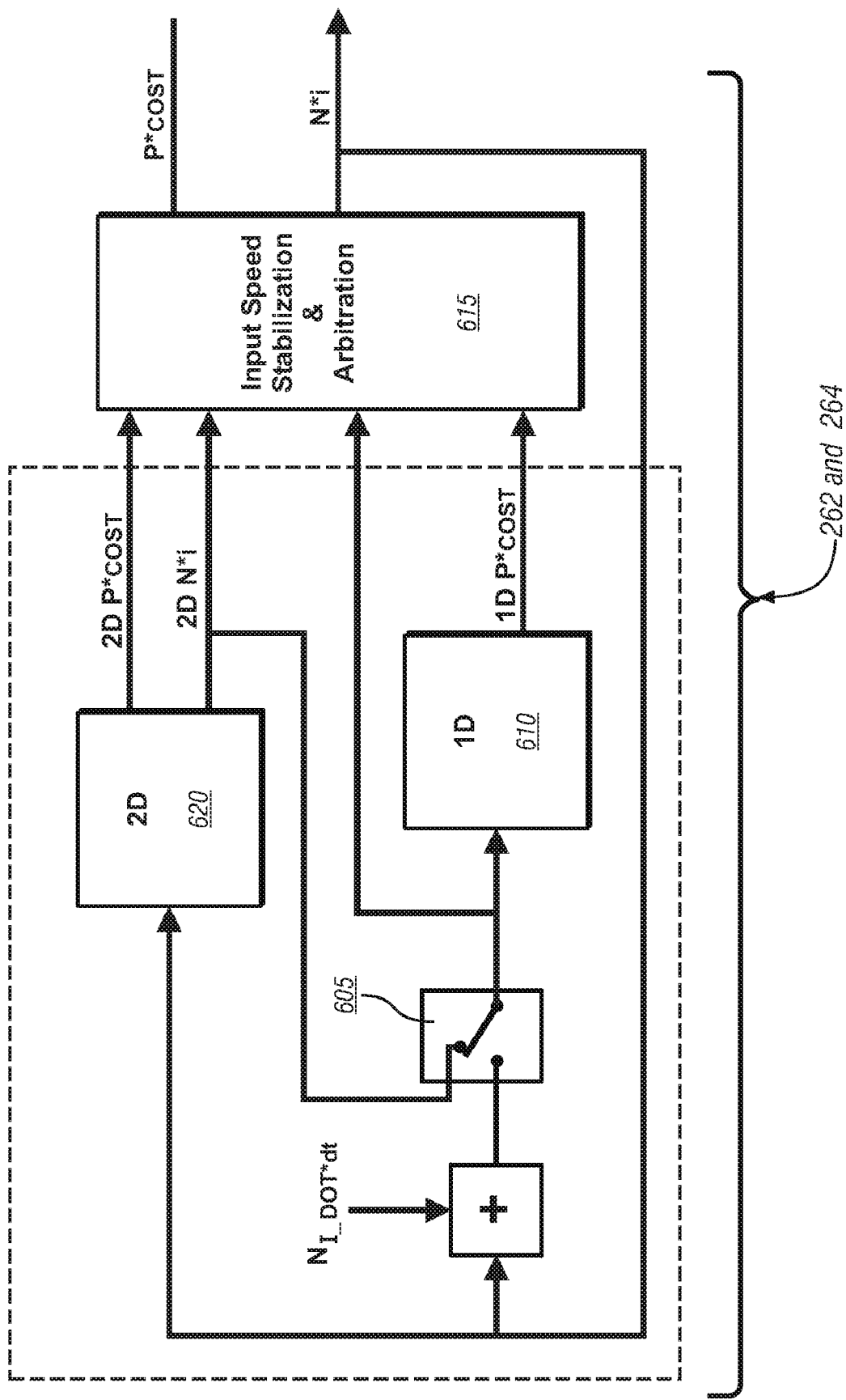

FIG. 7 shows the preferred operation in each of continuously variable modes M1 and M2 executed in blocks 262 and 264 of the operating range state analyzer 260. This includes executing a 2-dimensional search scheme 620, shown with reference to FIGS. 6 and 8, in conjunction with executing a 1-dimensional search using the 1-dimensional search scheme 610 based upon a previously determined input speed which can be arbitrated ('Input Speed Stabilization and Arbitration') 615 to determine preferred costs ('P*cost') and associated preferred input speeds ('N*i') for the operating range states. As described with reference to FIG. 8, the 2-dimensional search scheme 620 determines a first preferred cost ('2D P*cost') and an associated first preferred input speed ('2D N*I'). The first preferred input speed is input to the 2-dimensional search scheme 620 and to an adder. The adder sums the first preferred input speed and a time-rate change in the input speed ('$N_{I\_DOT}$') multiplied by a predetermined time period ('dt'). The resultant is input to a switch 605 along with the first preferred input speed determined by the 2-dimensional search scheme 620. The switch 605 is controlled to input either the resultant from the adder or the preferred input speed determined by the 2-dimensional search scheme 620 into the 1-dimensional search scheme 610. The switch 605 is controlled to input the preferred input speed determined by the 2-dimensional search scheme 620 into the 1-dimensional search scheme 610 (as shown) when the powertrain system is operating in a regenerative braking mode, e.g., when the operator torque request includes a request to generate an immediate output torque at the output member 64 to effect a reactive torque with the driveline 90 which preferably decelerates the vehicle. The switch 605 is controlled to a second position (not shown) to input the resultant from the adder when the operator torque request does not include regenerative braking. The 1-dimensional search scheme 610 is executed to determine a second preferred cost ('1D P*cost') using the 1-dimensional search scheme 610, which is input to the input speed stabilization and arbitration block 615 to select a final preferred cost and associated preferred input speed.

Figure 8:
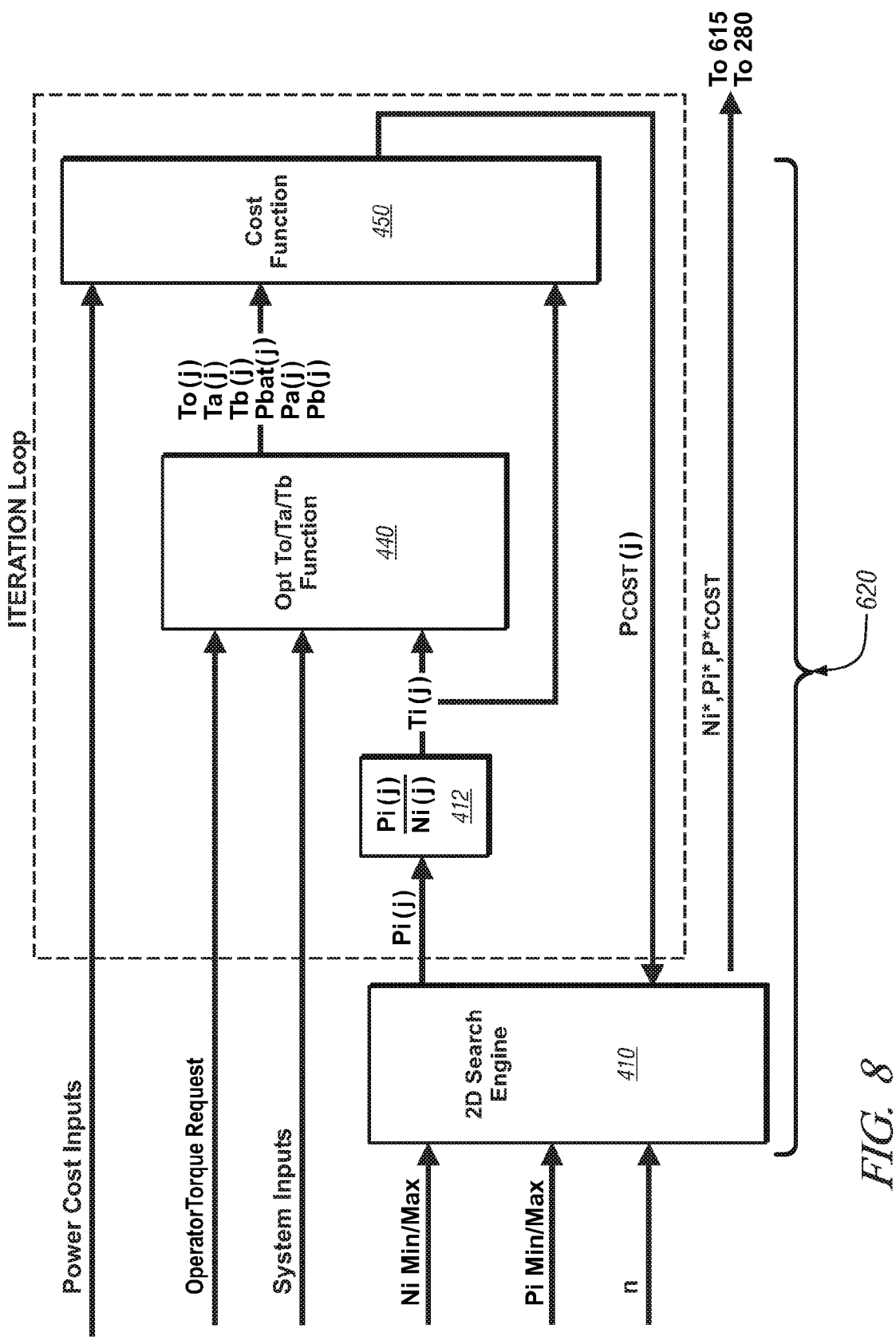

FIG. 8 schematically shows signal flow for the 2-dimension search scheme 620. Ranges of two controllable inputs, in this embodiment comprising minimum and maximum input speeds ('NiMin/Max') and minimum and maximum input powers ('PiMin/Max'), are input to a 2-D search engine 410. In another embodiment, the two controllable inputs can comprise minimum and maximum input speeds and minimum and maximum input torques. The 2-D search engine 410 iteratively generates candidate input speeds ('Ni(j)') and candidate input powers ('Pi(j)') which range between the minimum and maximum input speeds and powers. The candidate input power is preferably converted to a candidate input torque ('Ti(j)') (412). Each candidate input speed ('Ni(j)') and candidate input torque ('Ti(j)') are input to an optimization function ('Opt To/Ta/Tb') 440, for n search iterations. Other inputs to the optimization function 440 include system inputs preferably comprising parametric states for battery power, clutch torques, electric motor operation, transmission and engine operation, the specific operating range state and the operator torque request. The optimization function 440 determines transmission operation comprising an output torque, motor torques, and associated battery powers ('To(j), Ta(j), Tb(j), Pbat(j), Pa(j), Pb(j)') associated with the candidate input power and candidate input speed based upon the system inputs and the operating torque request for the candidate operating range state. The output torque, motor torques, and associated battery powers and power cost inputs are input to a cost function 450, which executes to determine a power cost ('Pcost(j)') for operating the powertrain at the candidate input power and candidate input speed in response to the operator torque request in the candidate operating range state. The 2-D search engine 410 iteratively generates the candidate input powers and candidate input speeds over the range of input speeds and range of input powers and determines the power costs associated therewith to identify a preferred input power ('P*') and preferred input speed ('Ni*') and associated preferred cost ('P*cost'). The preferred input power ('P*') and preferred input speed ('N*') comprises the candidate input power and candidate input speed that result in a minimum power cost for the candidate operating range state.

Figure 9:
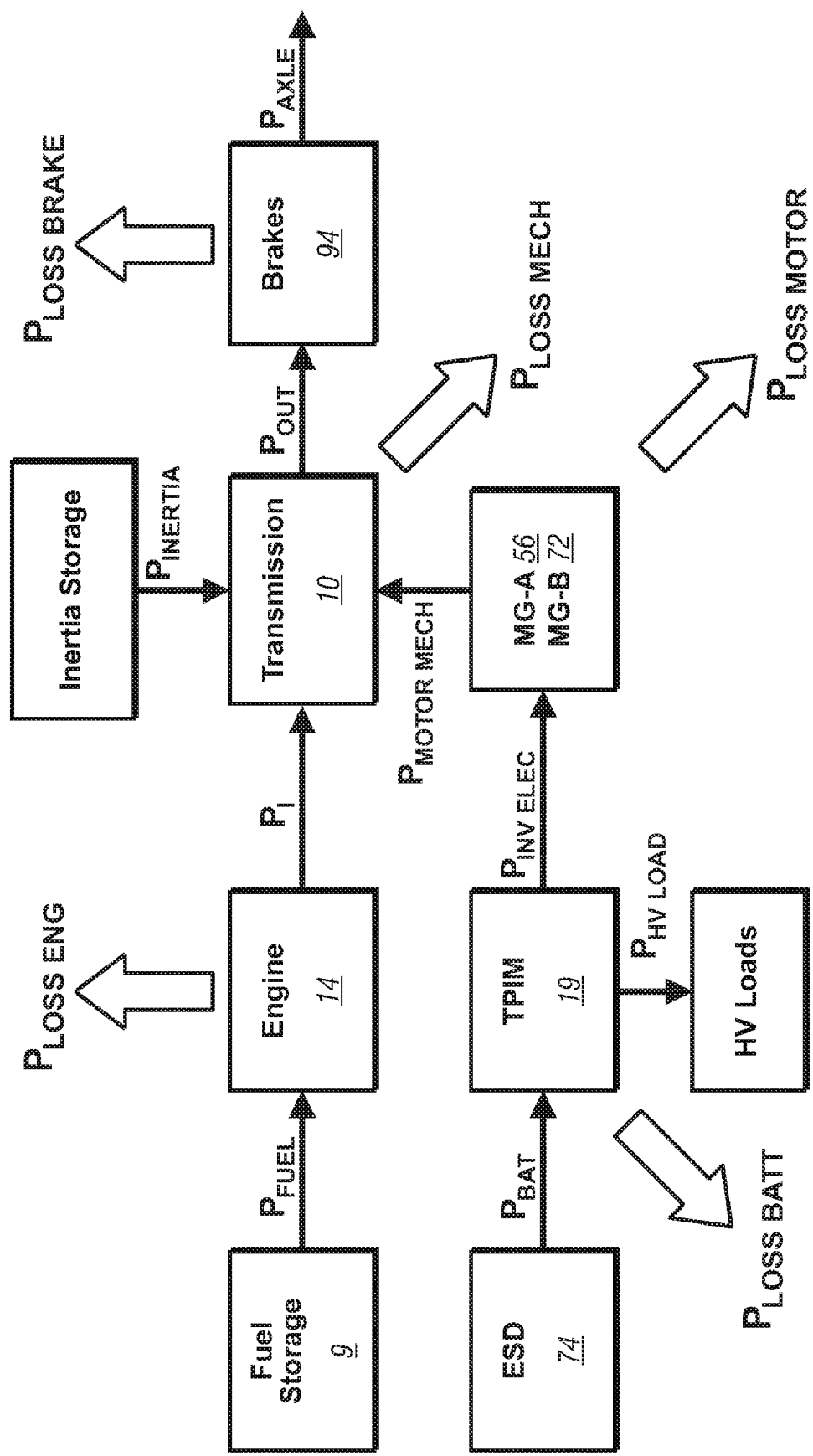
FIG. 9 is a schematic power flow diagram, in accordance with the present disclosure.

FIG. 9 schematically shows power flow and power losses through hybrid powertrain system, in context of the exemplary powertrain system described above. There is a first power flow path from a fuel storage system 9 which transfers fuel power ('$P_{FUEL}$') to the engine 14 which transfers input power ('$P_I$') to the transmission 10. The power loss in the first flow path comprises engine power losses ('$P_{LOSS\ ENG}$'). There is a second power flow path which transfers electric power ('$P_{BATT}$') from the ESD 74 to the TPIM 19 which transfers electric power ('$P_{IN\ ELEC}$') to the first and second electric machines 56 and 72 which transfer motor power ('$P_{MOTOR\ MECH}$') to the transmission 10. The power losses in the second power flow path include battery power losses ('$P_{LOSS\ BATT}$') and electric motor power losses ('$P_{LOSS\ MOTOR}$'). The TPIM 19 has an electric power load ('$P_{HV\ LOAD}$') that services electric loads in the system ('HV Loads'), which can include a low voltage battery storage system (not shown). The transmission 10 has a mechanical inertia power load input ('$P_{INERTIA}$') in the system ('Inertia Storage') that preferably include inertias from the engine 14 and the transmission 10. The transmission 10 has a mechanical power losses ('$P_{LOSS\ MECH}$') and power output ('$P_{OUT}$') which can be affected by brake power losses ('$P_{LOSS\ BRAKE}$') when being transferred to the driveline in the form of axle power ('$P_{AXLE}$').

The power cost inputs to the cost function 450 are determined based upon factors related to vehicle driveability, fuel economy, emissions, and battery usage. Power costs are assigned and associated with fuel and electrical power consumption and are associated with specific operating points of the hybrid powertrain. Lower operating costs can be associated with lower fuel consumption at high conversion efficiencies, lower battery power usage, and lower emissions for each engine speed/load operating point, and take into account the candidate operating state of the engine 14. As described hereinabove, the power costs may include the engine power losses ('$P_{LOSS\ ENG}$'), electric motor power losses ('$P_{LOSS\ MOTOR}$'), battery power losses ('$P_{LOSS\ BATT}$'), brake power losses ('$P_{LOSS\ BRAKE}$'), and mechanical power losses ('$P_{LOSS\ MECH}$') associated with operating the hybrid powertrain at a specific operating point which includes input speed, motor speeds, input torque, motor torques, a transmission operating range state and an engine state.

A preferred operating cost ($P_{COST}$) can be determined by calculating a total powertrain system power loss $P_{LOSS\ TOTAL}$ and a corresponding cost penalty. The total system power loss $P_{LOSS\ TOTAL}$ comprises all powertrain system power losses and includes the engine power losses $P_{LOSS\ ENG}$, electric motor power losses $P_{LOSS\ MOTOR}$, battery power losses $P_{LOSS\ BATT}$, brake power losses $P_{LOSS\ BRAKE}$, and mechanical power losses $P_{LOSS\ MECH}$.

The engine power loss in the engine 14 includes power losses due to fuel economy, exhaust emissions, losses in the mechanical system (e.g., gears, pumps, belts, pulleys, valves, chains), losses in the electrical system (e.g., wire impedances and switching and solenoid losses), and heat losses. The engine power loss can be determined for each operating range state based upon input speed and input torque and/or input speed and input power.

Thus, in fixed gear operation, i.e., in one of the fixed gear operating ranges states of G1, G2, G3 and G4 for the embodiment described herein, the power cost input comprising the mechanical power loss to the cost function 450 can be predetermined outside of the 1-dimension search scheme 610. In mode operation, i.e., in one of the mode operating ranges states of M1 and M2 for the embodiment described herein, the power cost input comprising the mechanical power loss to the cost function 450 can be determined during each iteration of the search scheme 620.

The state stabilization and arbitration block 280 selects a preferred transmission operating range state ('Hybrid Range State Des') which preferably is the transmission operating range state associated with the minimum preferred cost for the allowed operating range states output from the operating range state analyzer 260, taking into account factors related to arbitrating effects of changing the operating range state on the operation of the transmission to effect stable powertrain operation. The preferred input speed ('Ni_Des') is the engine input speed associated with the preferred engine input comprising the preferred engine input speed ('Ni*'), the preferred engine input power ('Pi*'), and the preferred engine input torque ('Ti*') that is responsive to and preferably meets the operator torque request for the selected preferred transmission operating range state.

The cost information used in the cost function of each iteration loop in some embodiments comprises operating costs, in terms of energy usage, which are generally determined based upon factors related to vehicle drivability, fuel economy, emissions, and battery life for the operating range state. Furthermore, costs may be assigned and associated with fuel and electrical power consumption associated with a specific operating point of the powertrain system for the vehicle. Lower operating costs are generally associated with lower fuel consumption at high conversion efficiencies, lower battery power usage, and lower emissions for an operating point, and take into account a current operating range state of the powertrain system. The optimum operating cost ($P_{COST}$*) can be determined by calculating a total powertrain system loss, comprising an overall system power loss and a cost penalty, such as can be associated with controlling battery state of charge. The overall system power loss comprises a term based upon engine power loss driven by fuel economy and exhaust emissions, plus losses in the mechanical system (e.g., gears, pumps, belts, pulleys, valves, chains), losses in the electrical system (e.g., wire impedances and switching and solenoid losses), and heat losses. Other losses to be considered may include electrical machine power losses, and factors related to battery life due to depth of discharge of the ESD 74, current ambient temperatures and their effect on state of charge of the battery. Due to subjective constraints imposed on a system such as that herein described, the transmission operating range state selected may not in all cases be that which is truly optimal from the standpoint of energy usage and power losses. At any one instant in time, a particular transmission operating range state and engine state may be desirable, advantageous or preferred, while at subsequent instants in time other transmission operating range states and engine states may be desirable, advantageous or preferred, with the result being that over even a relatively short time span of operation such as, for example, five minutes, conditions making dozens or more desirable, advantageous, or preferred transmission operating range states and engine states exist during such time span. However, this disclosure provides that altering the transmission operating range state and engine states in response to each and every single change in operating conditions encountered is not necessarily desirable in a motorized vehicle having an electro-mechanical hybrid transmission.

Given various operating conditions possible for a motorized vehicle equipped with an electro-mechanical hybrid transmission, which include varied environmental and road conditions such as road grade and operator torque demands, it is generally possible for an electro-mechanical hybrid transmission to be usefully operatively engaged potentially in more than one transmission operating range state, including such range states specified in Table I, at a given time during its operation. Moreover, it may be true that for every change in road grade, accelerator pedal position, and brake pedal depression that a motorized vehicle including an electro-mechanical hybrid transmission experiences during the course of its typical travel, differing transmission operating range state and engine states of the engine may at any time be viewed as being advantageous in consideration of an overall balance between such factors including fuel economy, required torque output of the transmission, and state-of-charge of the ESD 74.

Figure 10:
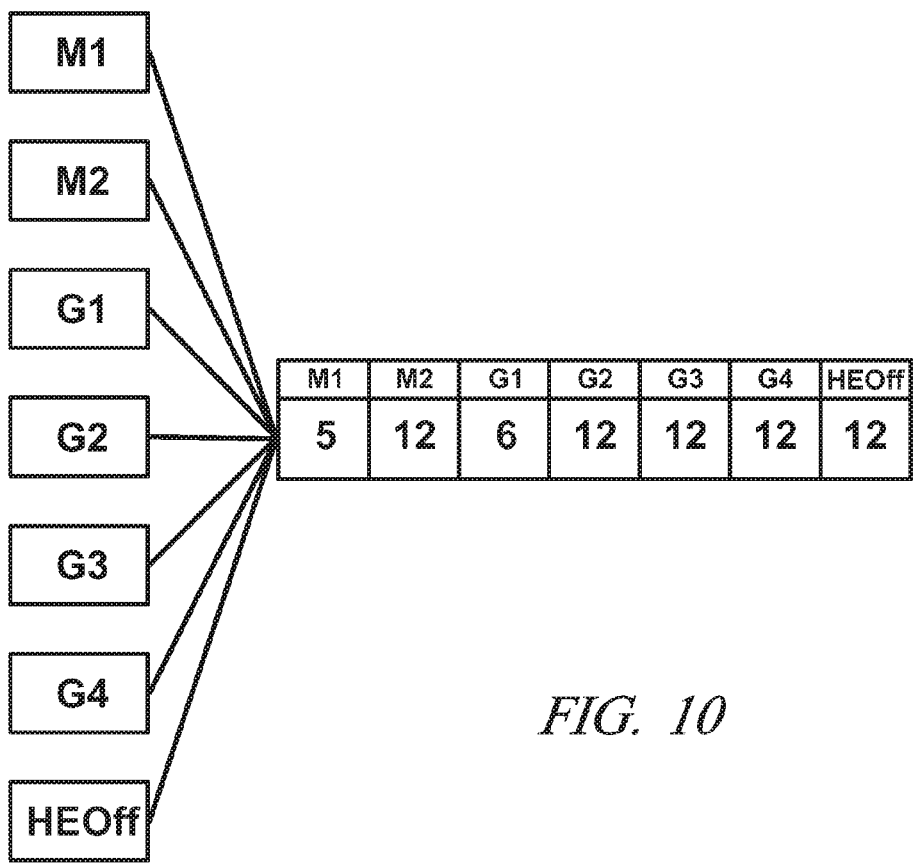
FIG. 10 illustrates an arrangement of a first plurality of preferability factors relating to a method, in accordance with the present disclosure.

According to one embodiment of this disclosure, FIG. 10 shows a first plurality of numerical values, each of which represents a preferability factor for each of the potential operating range states of an electro-mechanical hybrid transmission, and potential engine states for the engine, including the operating range states and engine states specified in Table I. In FIG. 10, the designations M1 and M2 refer to mode 1 and mode 2 of the electro-mechanical hybrid transmission. For purposes of the disclosure, the term 'candidate operating range state' can be used interchangeably with 'potential operating range state' and the term 'candidate engine state' can be used interchangeably with 'potential engine state'. The designations G1, G2, G3, and G4 refer to gear 1, gear 2, gear 3, and gear 4, respectively, and HEOff refers to the engine state, which engine state is either engine-on or engine-off. In one embodiment of this disclosure, any one or more such preferability factors may be arbitrarily assigned. In another embodiment, any one or more of such preferability factors may comprise an output generated as a result of any algorithmic or other data processing method which has as an input or basis any information provided by any one or more sensors disposed at any location on a motorized vehicle equipped with such an electro-mechanical hybrid transmission, or disposed on, at, or near any portion of its drive train where data may be acquired. Such sensors may include without limitation: a wheel speed sensor 94, an output speed sensor 84, and a rotational speed sensor 11.

It is desired that the preferability factors provided for each of the transmission operating range states and engine state shown in FIG. 10 are maintained in association with their respective transmission operating range state and engine state, and according to one embodiment of this disclosure such preferability factors are set forth in an array, as shown in FIG. 10. This arrangement is not a strict requirement, but is of convenience when performing a method according to this disclosure, as shown and described in relation to FIG. 11.

This disclosure also provides a plurality of numerical values, each of which is associated with one of the possible operating range states and engine states of an electro-mechanical hybrid transmission at any selected point in time while in service in a motorized vehicle, such as during operation while a vehicle is traveling on a road surface, which plurality may be referred to as current operating range state values. Preferred embodiments include a numerical value associated with the engine state. This second plurality of numerical values are shown arranged in an array in FIG. 11 labeled as "current operating range factors" which includes numerical values for both the transmission operating range state and the engine state.

Figure 11:
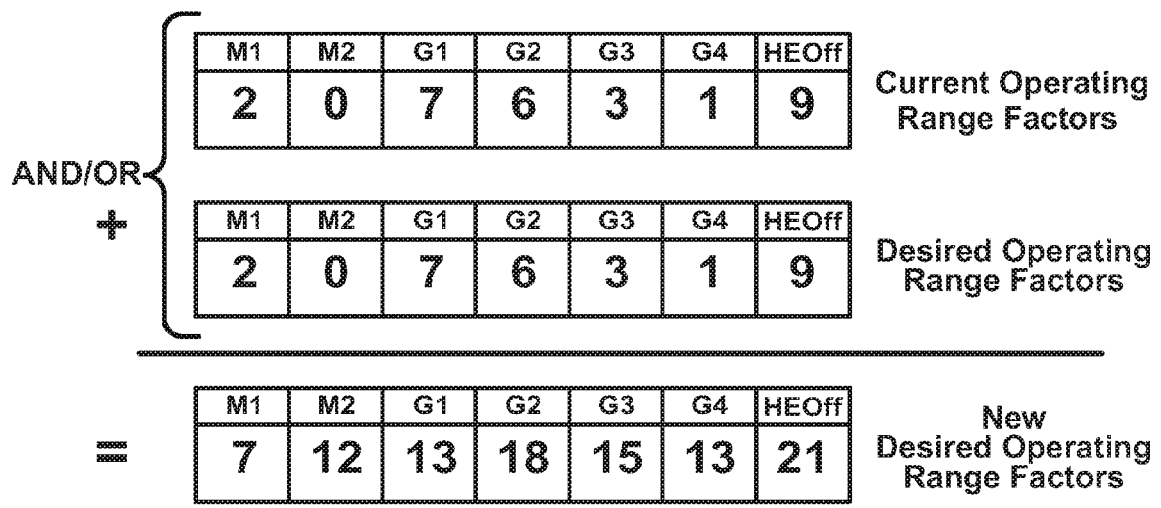
FIG. 11 illustrates a combination of a plurality of preferability factors, in accordance with the present disclosure.

FIG. 11 illustrates how the numerical values of the first plurality of preferability factors from FIG. 10 may be combined with the second plurality of preferability factors from the current operating range state and engine state. In one embodiment, the combination is made by summing the numerical values from each corresponding operating range state and engine state in each array, to arrive at a third array that comprises preferability factors for each possible transmission operating range state and engine state, which is labeled "new desired operating range factors". As used herein, a desired operating range state refers to a transmission operating range state or engine state that is, for one reason or another, generally relating to drivability, but may relate to engine economy, emissions or battery life, more desirable than the current transmission operating range state and/or engine state. The numerical values present in the third array may be compared to one another, and in one embodiment the lowest numerical value present in the third array represents the transmission operating range state or engine state which is to be selected or evaluated for selection as a basis upon which to make a change in operating state of the electro-mechanical hybrid transmission while a motorized vehicle containing same is in operation. For example, in the third array in FIG. 11, the lowest numerical value is 7, corresponding to M1 operation of the electro-mechanical hybrid transmission, whereas the current operating range state for the transmission is M2, evidenced by the zero in the current operating range array being the lowest numerical value. In one illustrative, non-limiting exemplary embodiment, a signal would be sent to a shift execution module embedded in the TCM 17, suggesting a change of transmission operating range state from M2 to M1, which may be effected by the TCM. In alternate embodiments, the TCM may be provided with additional decision-making data and algorithms to either accept and execute a suggested command change resulting from a process according to this disclosure, or it may deny such execution, based on other factors programmed into the TCM 17 which can be arbitrary in one embodiment, and in other embodiments are based on the output of one or more algorithms having inputs provided by on-board vehicle sensors. In one embodiment of the disclosure, the TCM 17 provides current operating range factors, which may be in the same format that the numerical values for the second plurality of preferability factors are in. In other embodiments, the TCM 17 provides current operating range factors in any format different than that which the numerical values relating to the second plurality of preferability factors are in.

In another embodiment, the first plurality of preferability factors described in reference to FIG. 10 may be combined with an alternative plurality of preferability factors, which are depicted in the array labeled as the "desired operating range factors" (which include numerical values for both the transmission operating range state and the engine state) in FIG. 11, to arrive at a third array comprising a set of preferability factors which are considered the "new desired operating range factors". The preferability factors comprising the desired operating range factors may be an output generated as a result of any algorithm or other data processing method of information provided by any one or more sensors disposed at any location on a motorized vehicle equipped with such an electro-mechanical hybrid transmission, or disposed on, at, or near any portion of its drive train where data may be acquired. Such sensors include without limitation: a wheel speed sensor 94, an output speed sensor 84, and a rotational speed sensor 11. In another embodiment, the first plurality of preferability factors described in reference to FIG. 10 may be combined with both the preferability factors from the current operating range factors and the desired operating range factors to arrive at a third array comprising new desired operating range factors.

In general, one or more of the preferability factors among the desired operating range factors will change over time, in response to changing operating conditions encountered by a motorized vehicle equipped with an electro-mechanical hybrid transmission, and the value of these factors may either increase or decrease during vehicle operation. For example, when a operator torque request upon encountering an uphill grade while traveling at a low speed, the preferability factor associated with G1 operation may be caused to decrease in value in response thereto. Similarly, when the vehicle operator makes a braking torque request upon encountering an downhill grade while traveling at a constant speed, the preferability factor associated with G1 operation may be caused to increase substantially in value so that selection of the G1 operating range is essentially precluded.

In FIG. 11, the numerical values in the arrays comprising the current operating range factors and the desired operating range factors are identical only for illustrative purposes, and in practice the numerical values present in these sets of preferability factors may differ from one another. For embodiments in which the first plurality of preferability factors from FIG. 10 are combined with those of the desired operating range factors, a third array comprising preferability factors for a new desired operating range factors are provided, at least one of which factors are subsequently provided to a shift control module which may be embedded in the TCM 17. For instances in which the shift control module orders the execution of a change in transmission operating range state, engine state, or both, the preferability factors comprising the new desired operating range factors are communicated as an input to a process of this disclosure as the desired operating range factors in a subsequent iteration of a process as herein described, as it is desirable in such embodiments to repeatedly perform a method as described herein at any time interval desired or selected, which may be any interval between about 2 milliseconds and about 300 milliseconds, including all intervals and ranges of intervals therebetween.

In preferred combinations of preferability factors according to the disclosure, it is desirable to only combine preferability factors of like kind with one another, i.e., preferability factors relating to M1 may only be combined with other preferability factors which relate to M1, G2 with G2, and so forth. Although combination of arrays, each of which comprise a plurality of preferability factors according to one embodiment of this disclosure has been shown and described as involving the summation of such arrays, and selecting the least value present in an array as a value for consideration in making a change in the operating range of an electro-mechanical hybrid transmission, the present disclosure also includes embodiments in which the selection criteria is to choose the largest numerical value. In other embodiments, the combination of two or more arrays may include subtraction, division, or multiplication of the numerical values corresponding to each operating range present in the arrays so combined, to provide that one of the values emerges as unique or differentiable from the remaining values present as a result of such combination, each value representing a relative preferability of the engine state or transmission range state. Selection is then made basis the highest or lowest numerical value present, or any other differentiable numerical attribute, in each of such embodiments. For cases where two or more preferability factors present in a set or array which results from a combination of preferability factors as provided herein are identical or non-differentiable from one another, the selection of a transmission operating range from such non-differentiable values may be arbitrary, or may be set to any default selection desired.

In one embodiment of the disclosure, the numerical values of the first plurality of preferability factors in the array shown in FIG. 10 may be selected to be of a size sufficient to provide a biasing effect when combined with numerical values present in either the desired operating range factors or current operating range factors as described in reference to FIG. 11. For convenience according to one embodiment, sets of such preferability factors from FIG. 10 may be provided and arranged in a matrix, as shown in Table II and Table III below:

TABLE II

Bias offset matrix for stabilization of current operating range

| | | Desired Range | | | | | | |
|---|---|---|---|---|---|---|---|---|
| | | M1 | M2 | G1 | G2 | G3 | G4 | HEOff |
| Current Range | M1 | 0 | 0.5 | A | 0.5 | 0.5 | 0.5 | 0.5 |
| | M2 | 0.5 | 0 | 0.1 | 0.1 | 0.2 | 0.5 | 0.2 |
| | G1 | 0.5 | 0.5 | 0 | 0.5 | 0.3 | 0.5 | 0.5 |
| | G2 | 0.3 | 0.1 | 0.5 | 0 | 0.5 | 0.3 | 0.2 |
| | G3 | 0.5 | 0.2 | 0.3 | 0.5 | 0 | 0.5 | 0.5 |
| | G4 | 0.5 | 0.5 | 0.5 | 0.2 | 0.5 | 0 | 0.5 |
| | HEOff | 0.5 | 0.5 | 0.5 | 0.5 | 0.5 | 0.5 | 0 |

Thus, a plurality of preferability factors for the current operating range factors may be provided from such matrix. Under such an arrangement, if the current operating range of the electro-mechanical hybrid transmission is M1, then numerical values from the first row are chosen as the numerical values for the array to be used in a combination of arrays as described herein. Arrays for the desired operating range factors may be selected from a matrix such as that shown in Table III, as representative of preferability factor values associated with the desired operating range state of the electro-mechanical hybrid transmission and engine state.

TABLE III

Bias offset matrix for stabilization of previously selected desired operating range

| | | Desired Range | | | | | | |
|---|---|---|---|---|---|---|---|---|
| | | M1 | M2 | G1 | G2 | G3 | G4 | HEOff |
| Previously Selected Desired Range | M1 | 0 | 0.5 | B | 0.5 | 0.5 | 0.5 | 0.5 |
| | M2 | 0.5 | 0 | 0.1 | 0.1 | 0.2 | 0.5 | 0.2 |
| | G1 | 0.5 | 0.5 | 0 | 0.5 | 0.3 | 0.5 | 0.5 |
| | G2 | 0.3 | 0.1 | 0.5 | 0 | 0.5 | 0.3 | 0.2 |
| | G3 | 0.5 | 0.2 | 0.3 | 0.5 | 0 | 0.5 | 0.5 |
| | G4 | 0.5 | 0.5 | 0.5 | 0.2 | 0.5 | 0 | 0.5 |
| | HEOff | 0.5 | 0.5 | 0.5 | 0.5 | 0.5 | 0.5 | 0 |

When combining arrays comprising current operating range factors and desirable operating range factors described in reference to FIG. 11 with a plurality of preferability factors as provided in reference to FIG. 10 according to this disclosure, the net effect is to stabilize the shifting of the transmission to both the desired operating range and the current operating range by inclusion of the preferability factors provided according to FIG. 10. Through judicious selection of the values in Tables II and III above, an unexpected benefit arises in that it is possible to select values which prohibit specific changes in operating range states of an electro-mechanical hybrid transmission. For example, a change in operating range from M2 to G4 may be permitted, whereas a change in operating range from M2 to G3 may be forbidden, the choices of which changes to permit or forbid being in control of the user of a method herein by their judicious selection of numerical values for the preferability factors. In general, it is desirable to avoid selecting non-allowed range states, whether based on output speed of the transmission or any other criteria selected by a user. In one embodiment, different potential input speeds for M1 and M2 operation of the transmission are considered over time in providing corresponding numerical values for these states in the first plurality of numerical values, independent of the desired transmission operating range state. According to one embodiment, a selection process involves consideration only of the input speed associated with the desired transmission operating state selected. In one preferred embodiment, the numerical value representative of the current transmission operating range state has a bias of zero. In other embodiments, the numerical value representative of the current transmission operating range state has a relatively small bias, and may be either positive or negative. Although shown as positive numerical values, a preferability factor according to the disclosure may be negative, since the net result of a process herein which combines the different preferability factors for the result specified depends generally on their relative magnitudes with respect to one another.

Figure 12:
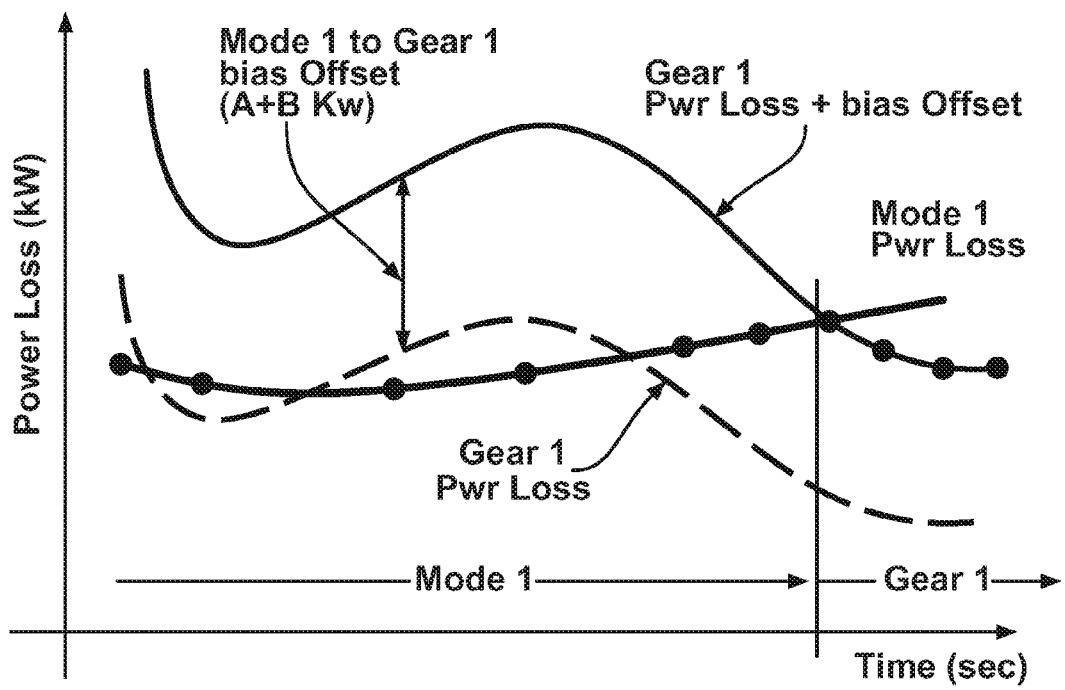
FIG. 12 provides a graphical representation of a stabilization of changes of operating range of an electro-mechanical hybrid transmission, in accordance with the present disclosure.
Figure 13:
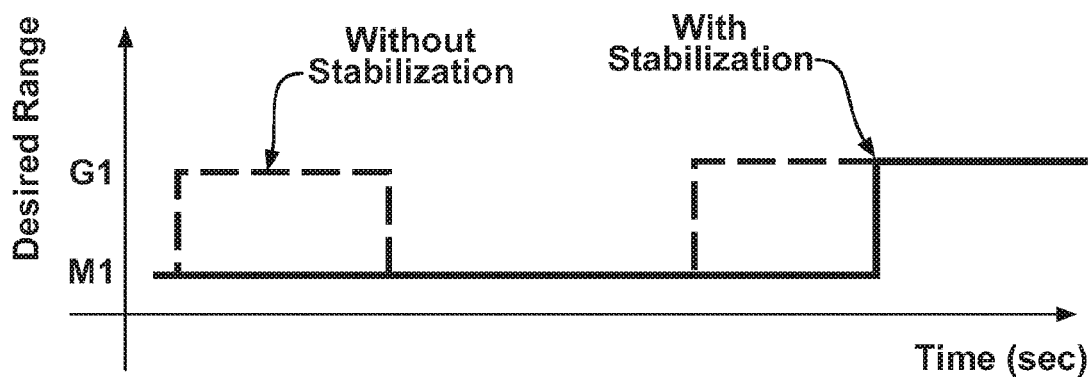
FIG. 13 shows an alternate graphical representation of a stabilization of changes of operating range of an electro-mechanical hybrid transmission, in accordance with the present disclosure.

The net effect of the stabilization of shifting events or changes of operating range of an electro-mechanical hybrid transmission according to this disclosure is illustrated in FIG. 12, which uses power loss as its ordinate; however, other units of ordinate may be employed as desired. In FIG. 12 the power loss associated with vehicle operation in G1 over time of varying operating conditions is shown by the dotted wavy line. As this power loss varies along the abscissa of time labeled as M1, it may be possible for other operating range states of the electro-mechanical hybrid transmission to be employed to advantage with respect to fuel economy, battery state-of-charge, total torque output, etc. However, given typical wide variance in torque demands over time by an operator, a plurality of shifting or transmission mode changes would adversely impact drivability of a vehicle so equipped. Hence, by the present incorporation of bias, by consideration of the preferability factors described, the power loss associated with vehicle operation in G1 over time of varying operating conditions may be moved upwards on the ordinate scale, to the corresponding solid wavy line, the amount of which bias is represented by the sum of factors A and B from the first row in Table II and Table III respectively. The result of this with reference to FIG. 12 is that the transmission operating range remains in M1 until the power loss associated with operating in that mode, plus the bias amount, exceeds the power loss of operating in another operating range state, in this case G1, at which point a change in operating range state is effected, with the power loss throughout the depicted time interval following the path marked by solid circles. Accordingly, situations where excessive operating range state changes of an electro-mechanical hybrid transmission occur, are maintained at any desirable level, dictated by the preferability factors chosen, which can mean their minimization, as well as substantial or complete elimination. This result is also depicted in FIG. 13, which shows the transmission desired operating range state as ordinate, depicting the removal of what would have been deemed as an undesirable operating range state change for some end-use applications of a vehicle equipped with an electro-mechanical hybrid transmission according to the disclosure.

In one embodiment, the matrices, arrays, or other arrangements of preferability factors as described herein are caused to be present in or accessible to a microprocessor, in hard or soft memory, and the combinations described herein are preferably carried out using such a processing device, which then issues an output to a TCM 17 that itself employs such output as an input in its own decision-making process. However, any arrangement of the preferability factors in memory which is convenient for computing purposes may be employed, in addition to such matrices or arrays as herein described. Individual preferability factors may relate to, or be based upon any number of potential variables relating to vehicle operation, and include without limitation variables relating to energy usage, drivability, fuel economy, tailpipe emissions, and battery state-of-charge, with information concerning such variables being provided in one embodiment, by sensors. In other embodiments, the preferability factors may be derived from or based on losses in a mechanical drive system, including losses due to belts, pulleys, valves, chains, losses in the electrical system, heat losses, electrical machine power losses, internal battery power loses, or any other parasitic loss in a vehicle system, taken either alone, or in combination with any one or more other loss or losses.

Figure 14:
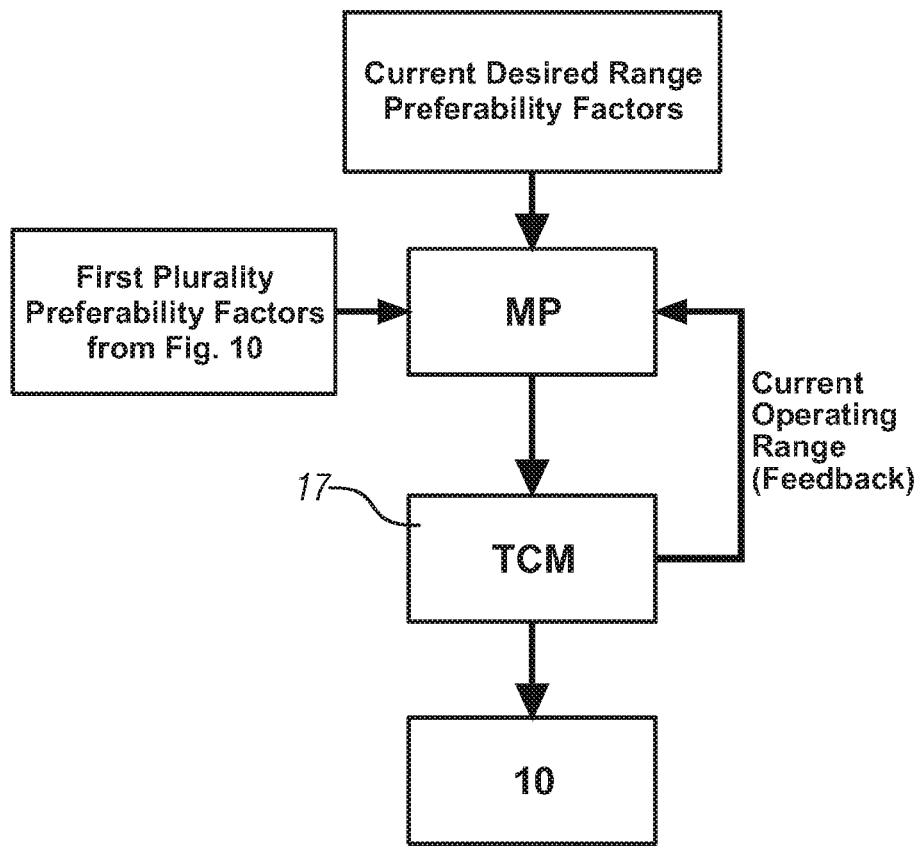
FIG. 14 depicts an architecture useful in carrying out execution of a change of operating range of an electro-mechanical hybrid transmission, in accordance with the present disclosure.

FIG. 14 depicts an architecture including a microprocessor, which is capable of carrying out execution of a change of operating range state of an electro-mechanical hybrid transmission according to one embodiment of the disclosure. FIG. 14 shows microprocessor MP, having inputs of the current desired range preferability factors, and the preferability factors described in reference to FIG. 10. The microprocessor has an output, which is inputted to a transmission control module, TCM 17, which itself provides feedback to the microprocessor in the form of a plurality of current operating range state preferability factors. The TCM 17 is capable of providing a suggested shift execution command to the transmission 10.

Operation of a vehicle equipped with an electro-mechanical hybrid transmission as herein described (including functionally-equivalent devices) also includes the transmission input speed, $N_I$, which itself is subject to change as vehicle operating conditions encountered during travel of a motorized vehicle vary. After undergoing a change in operating conditions, it is true that in many cases a different transmission operating range state may become more desirably employed than the present or current transmission operating range state. In general, the transmission input speed $N_I$ are different for different transmission operating range states possible when the motorized vehicle is traveling at the same given speed, when different operating modes or transmission operating states are contemplated as being employed as alternate operative modalities for operating at a same given speed. Accordingly, a change in transmission operating state and/or engine state is desirably accompanied by a change in transmission input speed $N_I$.

Figure 15:
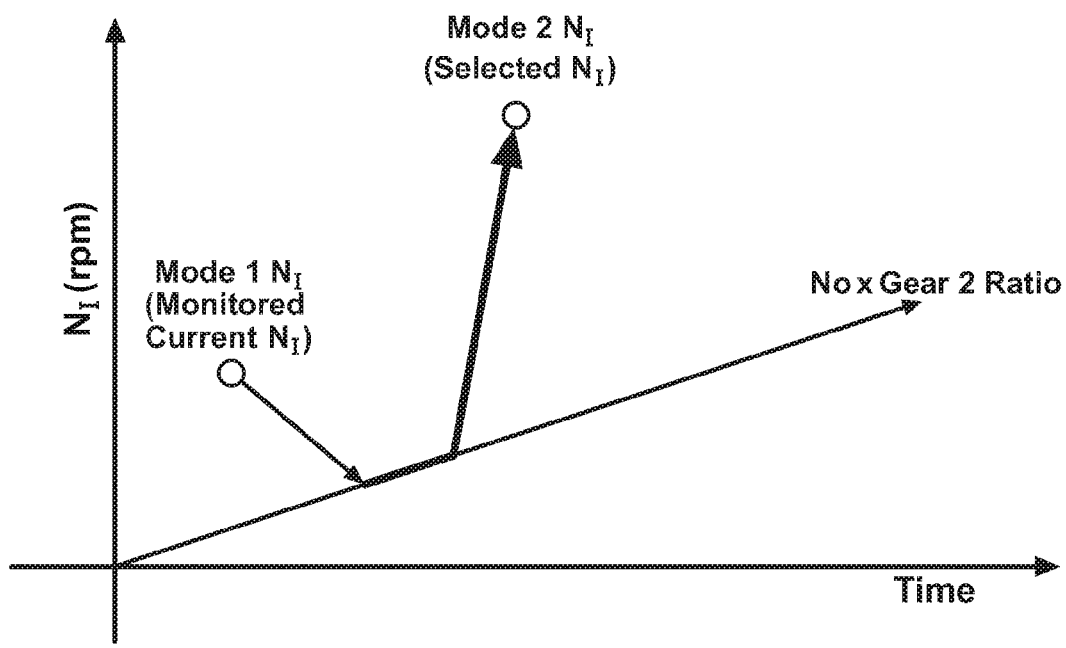
FIG. 15 shows a path taken by the transmission input speed over the course of a change from one potential transmission operating range state to another, in accordance with the present disclosure.

FIG. 15 illustrates graphically one example of how the transmission input speed $N_I$ may vary over time when a vehicle equipped with an electro-mechanical hybrid transmission as herein described undergoes an exemplary change in operating range state from M1 to M2. The $N_I$ for M1 represents the current $N_I$ when the current transmission operating range state is M1. G2 $N_I$ and M2 $N_I$ represent the selected (desired) $N_I$ for the corresponding transmission operating range states. Since a direct change of operating range state from M1 to M2 is forbidden, the transmission must first pass through G2. During such a transition, the necessary transmission input speed $N_I$ is seen to first decrease when going from M1 to G2, then to increase slightly over time during brief operation in G2, after which a steep increase in $N_I$ is experienced in achieving M2 operation. Therefore, the path or "trip" that the transmission input speed $N_I$ is seen to go through is given by:

$$(M1 N_I - G2 N_I) + (M2 N_I - G2 N_I) \quad [1]$$

in which M1 $N_I$ is the transmission input speed for transmission M1 operation; G2 $N_I$ is the transmission input speed for transmission G2 operation, M2 $N_I$ is the transmission input speed for transmission M2 operation, and G2 $N_I$ is the transmission input speed for transmission G2 operation. By weighting the direction of change of $N_I$, the total "cost" of the trip that the transmission input speed is seen to go through can be provided by a calculation of the type:

$$TC = [(M1\ N_I - G2\ N_I)*a + (M2\ N_I - G2\ N_I)*b]*x \quad [2]$$

in which the "*" character indicates a multiplication operation, and a and b are constants in which a is used for negative changes in $N_I$ and in which b is used for positive changes in $N_I$. In alternate embodiments, a and b are varying parameters which are a function of the corresponding distance of the $N_I$ trip or the corresponding desired transmission operating range state. The variable x, a trip-direction weighting constant, is a subjective value which may be set or determined by the vehicle engineers. The determination of x takes into account whether a potential change in transmission operating range state first requires a shift up followed by a shift down, or whether it first requires a shift down, followed by a shift up, as shown in FIG. 15. If the required sequence is shift down, then shift up, then x is set to a subjectively-determined value c. If the required sequence is shift up then shift down, the x is set to a subjectively-determined value d. For the case illustrated in FIG. 15, the formula for determining TC is:

$$TC = [(M1\ N_I - G2\ N_I)*a + (M2\ N_I - G2\ N_I)*b]*c \quad [3]$$

By analogous arithmetic a trip costing factor (TC) may be readily provided for every potential change in transmission operating range state and engine state by consideration of the trip that the $N_I$ must pass for a given potential change in transmission operating range state and engine state at any point in time of the vehicle travel. Although the changes in $N_I$ shown in FIG. 15 follow a straight-line path for purposes of illustration, in actual operation the changes in $N_I$ may also follow curved paths during all or a portion of the transition, wherein the paths may be either concave-up or concave-down. As shown as occurring at different points in time in FIG. 15, the calculation of the $N_I$ values for M1, which in this example is the origin of the trip is that of the monitored current $N_I$ value, and the calculation of $N_I$ values for G2 and M2 operation, which represent the intermediate and final destinations of the trip, may be conducted simultaneously.

Figure 16:
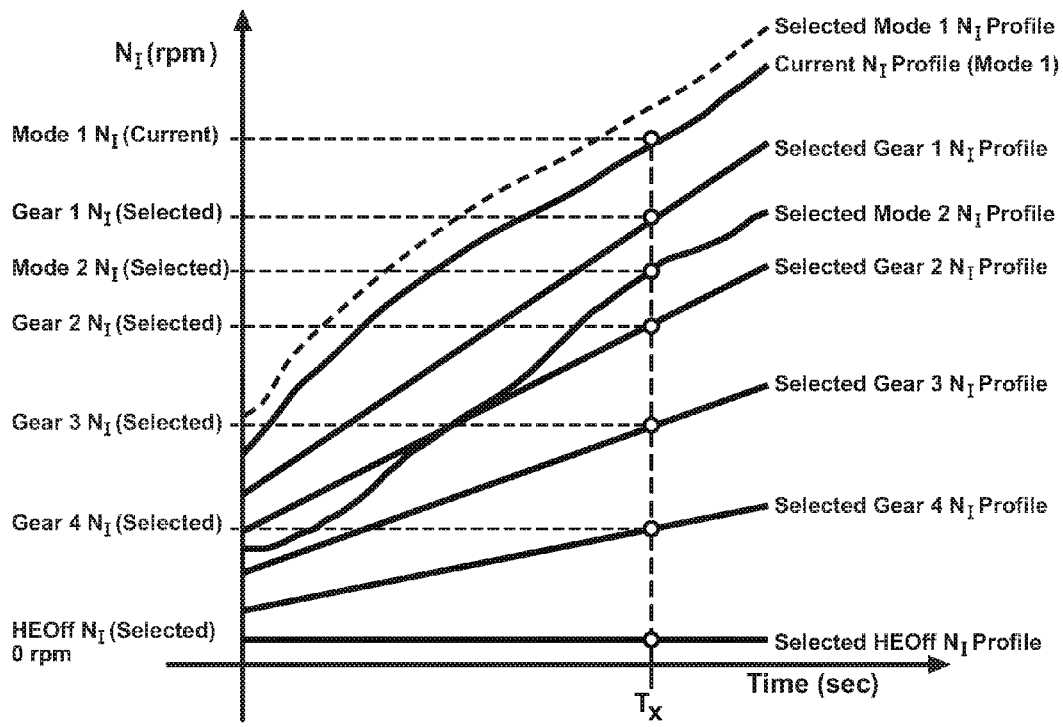
FIG. 16 illustrates variation in transmission input speed values as a function of time for various potential operating range states of an electro-mechanical hybrid transmission, in accordance with the present disclosure.
Figure 17:
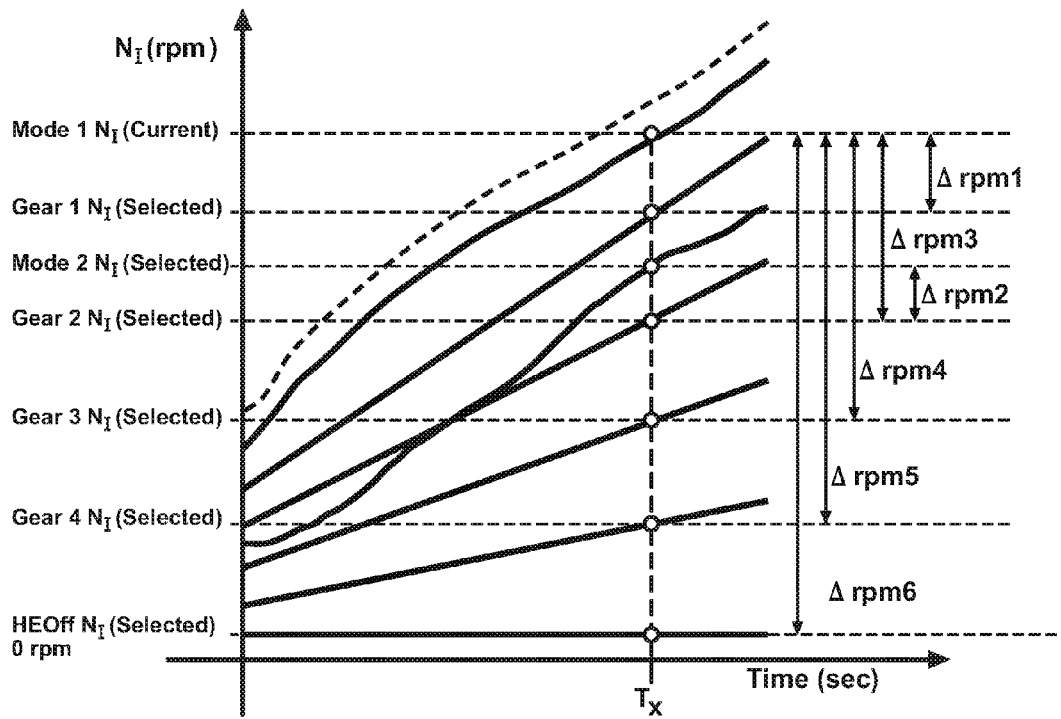
FIG. 17 shows differences in rpm values between different transmission input speed values at a selected point in time between various potential operating range states of an electro-mechanical hybrid transmission, in accordance with the present disclosure.

FIG. 16 graphically illustrates how selected values of $N_I$ may vary over time for each transmission operating range state shown during the operation of a motorized vehicle equipped with an electro-mechanical hybrid transmission as herein described. The current $N_I$ profile represents the monitored current $N_I$ values, which in this example is when the current transmission operating range state is M1. In one embodiment, the selected $N_I$ values (which may in alternate embodiments be desired $N_I$ values or required $N_I$ values) at various points in time are arbitrarily selected to yield the curves shown. In other embodiments the selected $N_I$ values at various points in time are based on the output of one or more algorithms having inputs provided by on-board vehicle sensors, which after manipulation such as by a microprocessor may provide curves similar or different to those shown in FIG. 16. Importantly, as shown in FIG. 9, for each point in time $T_x$ under consideration, there is associated with each of such curves a single point, which may be used as a basis for calculating the differences in rpm, labeled "Δ rpm" which differences in rpm are useful in determining a trip costing factor associated with every potential change in transmission operating range state for any desired point in time. While rpm is used herein to exemplify one implementation, other rotational speed metrics are equally applicable. In one embodiment, the Δ rpm values may be conveniently set forth in an array as in Table IV below:

TABLE IV rpm difference values associated with potential changes in transmission operating range states.

| M1 | M2 | G1 | G2 | G3 | G4 | HEOff |
|----|----|----|----|----|----|-------|
| 0 | Δ rpm 3<br>Δ rpm 2 | Δ rpm 1 | Δ rpm 3 | Δ rpm 4 | Δ rpm 5 | Δ rpm 6 | wherein the rpm differences associated with M2 involves the rpm difference M1 to G2 and G2 to M2 as earlier described. The M1 $N_I$ value used for the Δ rpm calculation is that of the current M1 $N_I$ value and not that of the selected M1 $N_I$ value. The values for the Δ rpm in Table IV are exemplary of those encountered when the transmission is presently in M1 operation, as the value of the Δ rpm for M1 is zero, which has a biasing effect that tends to maintain the transmission operating range state in M1, thus stabilizing the transmission operating range state with respect to M1 operation. In one embodiment, the values for the Δ rpm associated with each potential change in transmission operating range state, such as those provided in Table IV, are each next multiplied by the trip direction weighting constants a, b, c, d (which in alternate embodiments may be varying parameters which are a function of the corresponding distance of the trip, Δ rpm, or corresponding desired range) from the equation defining TC above for each associated potential change in transmission operating range state, to arrive at a new array comprising a plurality of Trips Costing factors (TC) representing preferability factors for each of the transmission operating range states that are effectively based on the input speed trip or profile associated with each potential change in operating range state of the transmission, of which the values in Table V are provided for exemplary purposes and are non-limiting of this disclosure:

TABLE V preferability factors based on transmission input speed $N_I$ trip

| M1 | M2 | G1 | G2 | G3 | G4 | HEOff |
|----|-----|-----|-----|-----|-----|-------|
| 0 | 0.6 | 0.3 | 0.4 | 0.5 | 0.7 | 0.8 |

Figure 18:
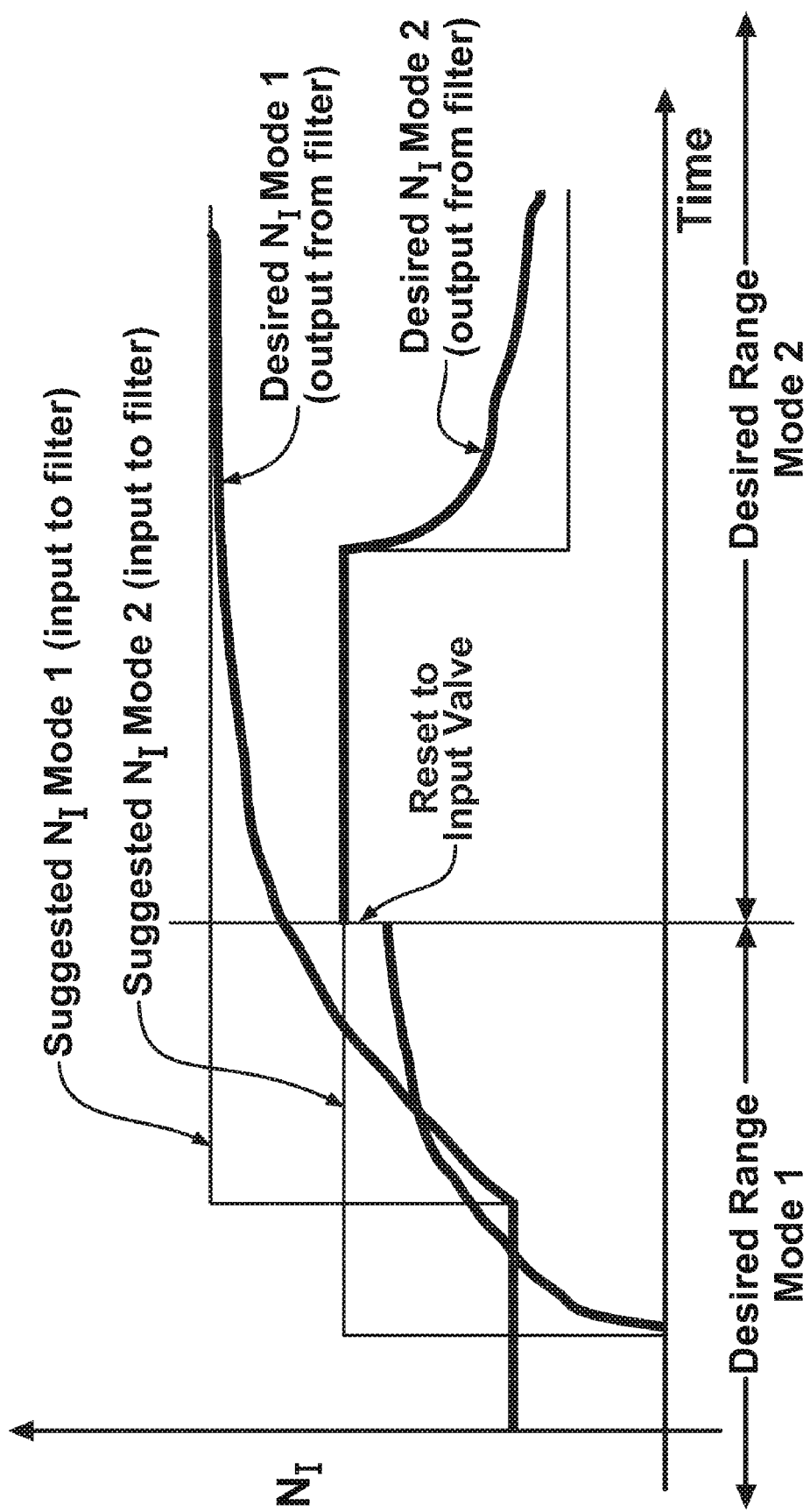
FIG. 18 shows a profile of how input speeds for an electro-mechanical hybrid transmission vary at a change in mode during resetting of a filter, in accordance with the present disclosure.

The preferability factors based on the input speed trip or profile ("transmission input speed trip preferability factors") associated with each potential operating range state of the transmission as set forth in Table V may be combined as herein specified with other sets of preferability factors, including one or more sets of preferability factors shown in and described with reference to FIG. 11 towards generation of new desired operating range factors. The selected $N_I$ values at various points in time as shown in FIG. 16 may be based on the output of one or more algorithms carried out in a microprocessor having one or more inputs provided by on-board vehicle sensors, including without limitation sensors mentioned herein. In some embodiments, transmission input speeds $N_I$ for M1 operation and M2 operation are provided at selected intervals with regard to the desired operating range state of the transmission. In one embodiment, the $N_I$ value for M1 is selected by a microprocessor which searches and selects an $N_I$ value that is associated with the least power loss, which in this embodiment may serve as, or as a basis for determining the preferability factor for M1 operation from FIG. 10. At or at about the same time, the $N_I$ value for M2 operation is selected by a microprocessor which searches and selects an $N_I$ value that is associated with the least power loss, which in this embodiment may serve as, or as a basis for determining the preferability factor for M2 operation from FIG. 10. Slight changes in operating conditions can substantially alter the preferability factors, and could result in transmission operation that would attempt to change gears or modes too frequently, and the biasing or weighting of the preferability factors as herein described alleviates undesirably frequent shifting. For embodiments in which $N_I$ values for M1 and M2 are continuously provided at short time intervals on the order of milliseconds in response to changes in vehicle operating conditions, given that slight changes in operating conditions can substantially alter the preferability factors, it occurs that there may be wide fluctuations in the $N_I$ values for M1 and M2 from one time interval to the next. Changing operating range state for every instance that a driving condition changed slightly would result essentially in a transmission which was nearly constantly attempting to change gears or modes, and the biasing or weighting of the preferability factors as herein described alleviates undesirably frequent shifting. Following generation of new desired operating range factors and selection of the desired operating range, the $N_I$ values for the desired operating range are evaluated for selection and it is frequently the case that the $N_I$ values may vary substantially from one interval to the next. It is accordingly desirable to "filter" the $N_I$ values, to remove noise, which noise comprises values that are very high above or below an average $N_I$ value owing to instantaneous fluctuation in the $N_I$ values during one or more short time intervals. In one embodiment, $N_I$ values for both M1 operation, M2 operation and neutral are filtered, even though the values of only one of M1 or M2 are actually to be used at a given point in time, i.e., the system continuously provides $N_I$ values for both M1 and M2 operation. In such embodiment, while input speeds $N_I$ for M1 or M2 operation are provided continuously or at selected intervals, only the input speed $N_I$ associated with the desired mode (either M1 or M2) is used for creating a desired transmission input speed profile based on current vehicle operating conditions. After selection of a desired range state is made, the selected $N_I$ values for M1 and M2 are filtered to reduce noise, while filtering, when the desired range changes reset the filter of the mode of the desired range that it is transitioning to, in order that the initial output value is equivalent to the input value, as shown in FIG. 18. The suggested $N_I$ values depicted therein will eventually be used to create a profile of desired input speeds based on what range is desired. For example, when M1 is selected as the desired range, $N_I$ M1 is used as the desired $N_I$ profile, as soon as M2 becomes desired the profile will switch to suggested $N_I$ M2. This selective resetting is done so that when the system switches from one profile to another, the non-filtered suggested $N_I$ is used as the initial value. When filtering the suggested input speeds for noise reduction, only the suggested input speed of the desired mode is filtered. This allows the suggested input speed to reset when its mode is chosen.

One consideration of operating a motorized vehicle that is equipped with an electro-mechanical hybrid transmission as described herein, is that the operator of such a motorized vehicle will at different times make different torque requests from the drivetrain (such as by depressing the vehicle accelerator or brake pedal). However, in many instances of operator torque requests, the vehicle drivetrain and/or braking system may be incapable of delivering the amount of torque requested by the operator, i.e., the brake or accelerator pedal may be depressed beyond the point at which the system capabilities to deliver the requested torque can be fulfilled. An accelerator pedal is one non-limiting form of an accelerator control.

For different potential engine operating points in operating range states of the transmission, given the same operator torque request, the differences between the operator-requested torque and the vehicle drivetrain capabilities typically differ from one another. In one embodiment of this disclosure, the difference between the amount of torque requested by the operator at a given point in time and the torque that is deliverable by the system when operating at a potential engine operating point is considered for each of the engine operating points, to generate a plurality of torque difference values for each of the engine operating points at substantially the time that the operator makes a torque request. In one embodiment a biasing "cost" value is assigned to each of the torque difference values in proportion to the magnitude by which the deliverable torque for a given engine operating point in a potential transmission operating range state falls short with respect to that of the operator torque request. Such biasing cost values generally reflect a lower degree of desirability for engine operating points having higher biasing costs associated with them for a given operator torque request, when such biasing costs are compared with one another and used as a basis in evaluating which engine operating point is most suitable or desirable for a given operator torque request at a particular point in time of the vehicle operation. In one embodiment, the sum of all components representing power losses for various drivetrain components and this bias cost (comprising the total power loss) for each potential engine operating point at the torque deliverable that is nearest to that requested by the operator are compared with one another, with that potential engine operating point having the least total power loss when operated at the torque nearest to that of the operator torque request being selected as the desired engine operating point.

Figure 19:
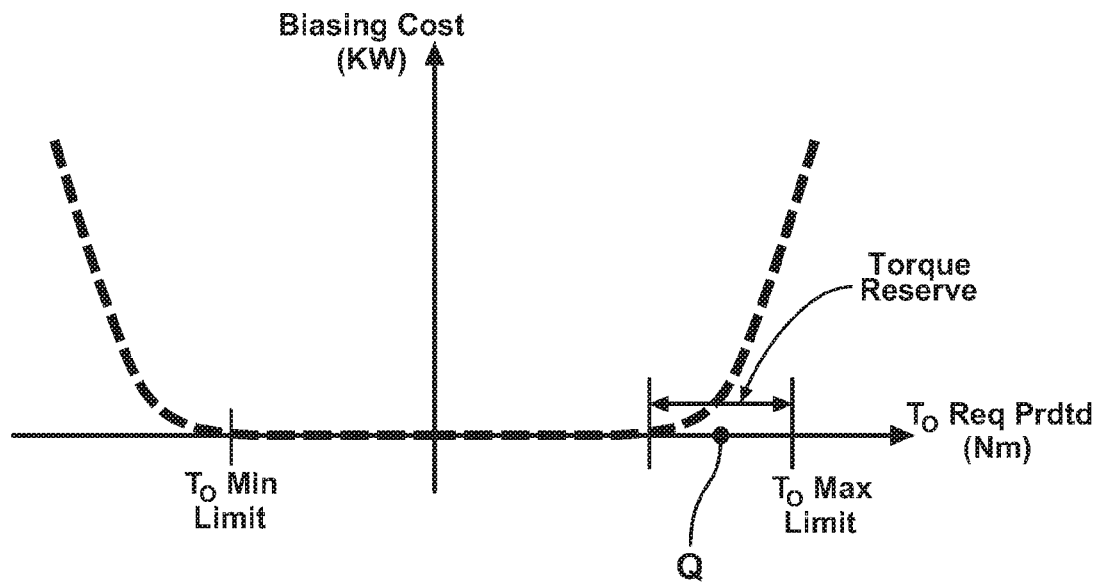
FIG. 19 illustrates one biasing cost function useful in biasing the preferability of a potential transmission operating range state for a given operator torque request, in accordance with the present disclosure.

FIG. 19 shows a cost function useful in providing biasing costs indicating a component of preferability of a potential engine operating point and transmission operating range state, which is dependent on the magnitude of an operator torque request. The exemplary definition of a biasing cost graph in FIG. 19 is a generally-parabolic cost profile, having as its abscissa the operator torque request. Such a biasing cost profile may be determined by any function desired, selected, or created by the vehicle engineers, and accordingly affords an opportunity to include a subjective aspect in the determination of preferability of different engine operating points and potential transmission operating range states. Function types useful in this regard include without limitation: hyperbolic functions, linear functions, continuous functions, non-continuous functions, constant functions, smooth-curved functions, circular functions, ovoid functions, and any combinations comprising any of the foregoing, either alone or mathematically combined with one another, over any range of operator torque request values desired or selected. Thus, in one embodiment, criteria used in the determination of which engine operating point and transmission operating range state is most desirable for a given operator torque request at any selected point in time of the travel of a vehicle having a drivetrain as herein described is not necessarily bound to the most efficient operation of the motorized vehicle in terms of fuel economy, power output, drivability, etc.

For each engine operating point in a potential transmission operating range state, there exists a minimum output torque ($T_O$ Min) and a maximum output torque ($T_O$ Max) that the drivetrain system is capable of delivering. The maximum output torque is generally applicable towards vehicle acceleration and includes such components as the engine input torque and motor torques from the first and second electric machines. The minimum output torque is generally applicable towards vehicle deceleration, and includes such components as braking torque provided during regenerative braking, including cases when the charging of a battery on-board the vehicle is accomplished, more or less, by one or more of the electric machines functioning in their capacity as electrical generators.

With respect to FIG. 19, which represents a single engine operating point in a potential transmission operating range state, it is clear that for a substantial range of possible operator torque request values residing between $T_O$ Min and $T_O$ Max, there is no biasing cost associated therewith, i.e., the value of the function represented by the dotted line is zero. As the operator torque request approaches or exceeds the $T_O$ Max value, however, the cost associated with the operator torque request is given by the ordinate value along the dotted line curve corresponding to the operator torque request. Other potential transmission operating range states may have the same, similarly-shaped, or differently-shaped functions associated with them, as desired.

In one embodiment, if the operator torque request is within a range between $T_O$ Min and $T_O$ Max where the biasing cost function represented by the dashed line curve in FIG. 19 is constant, in this case at zero, there is no biasing cost assigned for the particular engine operating point in the operating range state under consideration at levels of operator torque request residing within this range. When the operator torque request is for a torque that is greater than $T_O$ Max, the function determining the biasing costs associated with the torque request is represented by the dashed line in FIG. 11. This biasing cost may thus comprise a subjective component in addition to the objective costs associated with power losses in the determination of the engine operating point selection and the first plurality of numerical values shown in FIG. 10. Thus, in one embodiment, an operator torque request which only slightly exceeds that of $T_O$ Max, by, for example, 10 Newton-meters, will be assigned a biasing cost which is less than the biasing cost which would be assigned to an operator torque request which exceeds that of $T_O$ Max by more than 10 Newton-meters.

Table VI below is exemplary of one way to express costs associated with the difference between a vehicle operator torque request and the maximum torque deliverable by the drivetrain system for an exemplary potential transmission operating range state, wherein $\Delta$ N*m is the difference value in Newton-meters and kW is the cost, expressed in kilowatts in this example; however any other convenient units, or no units, may be used. Such an array may be stored in computer memory and accessed by a microprocessor, on an as-needed basis.

TABLE VI

Costs assigned for different torque requests for a potential transmission operating range state

| | $\Delta$ N*m | | | |
|---|---|---|---|---|
| | 0 | 10 | 100 | 1000 |
| kW | 0 | 20 | 50 | 180,000 |

Figure 20:
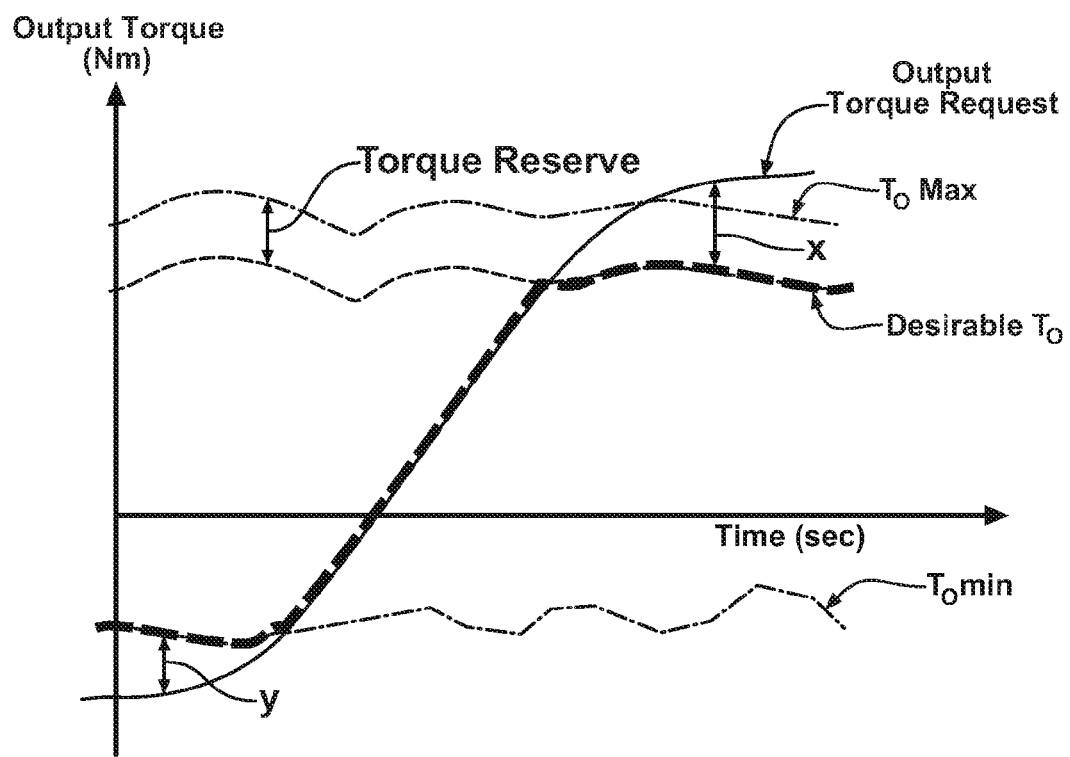
FIG. 20 is one embodiment of a representation of the difference over time between an operator torque request and a desirable transmission torque output for an exemplary transmission operating range state, in accordance with the present disclosure.

An alternative representation of the biasing cost associated with a potential transmission operating range state is shown in FIG. 20. In FIG. 20, the value x represents the difference between the amount of operator torque request and that torque output which is desirable ("Desirable $T_O$") for a potential transmission operating range state, as but one example. The Desirable $T_O$ is that amount of torque that is closest to the operator torque request that is available based on the output torque limits ($T_O$ Max and $T_O$ Min) of the selected engine operating points and the Torque Reserve for the particular potential transmission operating range state under consideration. The quantity x, which is a torque difference value ($\Delta$ N*m), varies, depending on which potential transmission operating state is under consideration, for the same operator torque request at a same given point in time of vehicle operation. Comparison of x values for different potential transmission operating range states given the same operator torque request enables selection of that potential transmission operating range state having the least x value, in one embodiment. In another embodiment, a biasing cost (weighting factor) may be assigned to the potential transmission operating range state having the least x value, which is combined with the sum of all components representing power losses for various drivetrain components, to arrive at a sum total power loss which may then be used as a criteria for selecting a particular potential transmission operating range state over others.

By providing a function having any desired features, including without limitation those features illustrated by the biasing costs curve in FIG. 19, it is possible to assign a biasing cost to a given operator torque request for particular instances even when the torque requested in an operator torque request is below the maximum system torque output. This is illustrated by an operator torque request having the magnitude at point Q in FIG. 19, which is below the $T_O$ Max, yet there is nevertheless a cost assigned for this potential transmission operating range state and operator torque request. Such a provision of costing (or biasing) operator torque requests allows establishment of a Torque Reserve over the range of operator torque requests which reside between $T_O$ Max and the operator torque request having the highest magnitude of torque for which no biasing cost is assigned over a range between $T_O$ Min and $T_O$ Max. The provision of a range of operator torque requests comprising such a Torque Reserve effectively biases the preferability of the transmission control system against selecting system actuator operating points and transmission operating range states having a $T_O$ Max which is greater than, yet near to, an operator torque request in an amount that is proportional to the difference between the operator torque request and the $T_O$ Max for the particular engine operating point in a transmission operating range state under consideration. Instead of biasing to select system actuator operating points which can produce the highest $T_O$ Max and lowest $T_O$ Min, including the Torque Reserve has the effect of decreasing the bias criteria point $T_O$ Max to $T_O$ Max subtracted by the Torque Reserve. This will not only effect the operator torque requests which exceed the maximum deliverable output torque, but also the operator torque requests that are less than and near the maximum deliverable output torque. This results in improved drivability of the motorized vehicle by reducing the tendency of the transmission system to cause multiple shifting events or mode changes when an operator torque request has a magnitude that is near the maximum deliverable for the transmission operating range state that is currently selected, i.e., currently under utilization. In embodiments which follow, no Torque Reserve is present.

Moreover, when an operator torque request exceeds $T_O$ Max (or is less than $T_O$ Min) for cases where a method according to this disclosure which so uses biasing costs is not employed, information relating to the amount by which an operator torque request exceeds $T_O$ Max (or is less than $T_O$ Min) is lost due to the fact that the total power loss evaluation is based on the deliverable output torque which is limited by $T_O$ Max and $T_O$ Min. Proceeding in accordance with a method of this disclosure and obtaining a biasing cost value for an operator torque request which exceeds $T_O$ Max (or is less than $T_O$ Min) provides information relative to the amount by which such a torque request is in excess of $T_O$ Max, and this information is incorporated into the overall selection process concerning which engine operating point and potential transmission operating state will be selected. In one embodiment, this information effectively biases a search engine embedded within software and/or hardware useful for providing the plurality of numerical values shown in FIG. 10 to locate an engine operating point within each potential transmission operating range state that biases towards providing the greatest value of $T_O$ Max (least value of $T_O$ Min). In one embodiment, the biasing costs associated with the operator torque request for each of the potential operating range states of the transmission substantially at the time an operator makes a torque request during vehicle operation are but one component used in determining a first plurality of numerical values as shown in FIG. 10.

In one embodiment, the calculation of each of the numerical values present in the first plurality of numerical values shown in FIG. 10 include components relating to objective power losses such as: engine power loss, battery power loss, electrical machine power loss, and transmission power loss. Another embodiment provides additional penalty costs, including costs for exceeding the battery power limits, engine torque limits, electric machine torque limits, and other subjective costs desired which may include biasing costs associated with the output torque request as herein described. Also included are the components generated as the result of an iterative data processing method that in one embodiment employs a microprocessor-based search engine.

Figure 21:
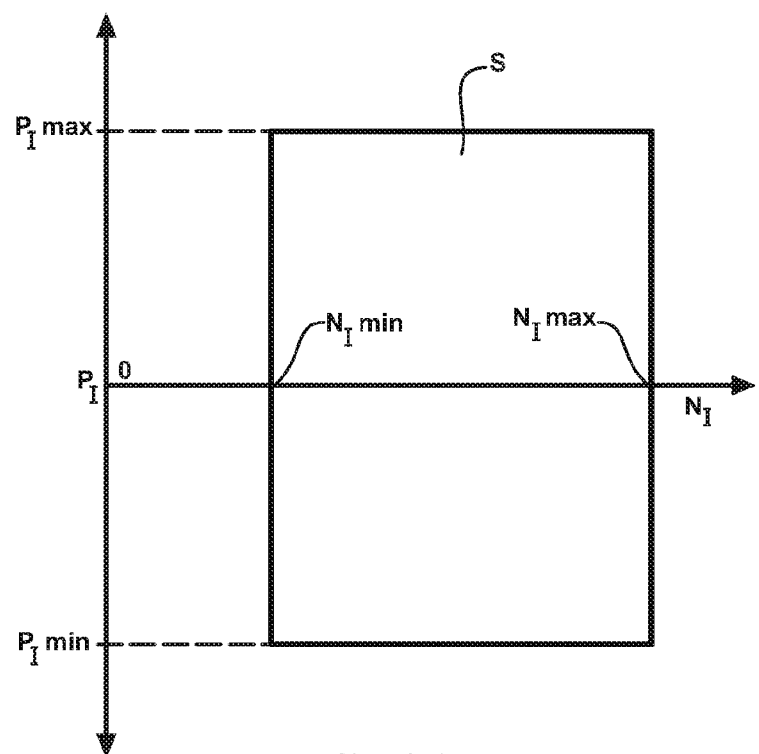
FIG. 21 is a graphical definition of the space in which a search engine selects values for evaluation of torque outputs, in accordance with the present disclosure.

A search engine suitable for such a method employs, for each continuously variable operating range state, a space that is defined as shown in FIG. 21 by the region on the coordinate axes bounded by $P_I$ Min, $P_I$ Max, $N_I$ Min, and $N_I$ Max, wherein $P_I$ represents power inputted to the electro-mechanical hybrid transmission and $N_I$ is the same transmission input speed. The search engine selects, either randomly or according to any desired algorithm, an $N_I$ and $P_I$ pair present in the space S and calculates a $T_O$ Min, $T_O$ Max and total power loss associated with the $N_I$ and $P_I$ pair chosen, based on drivetrain system component power losses and operating constraints, which constraints are either inherent in the system, or imposed by vehicle engineers. Repetition of this method for a large number of different $N_I$ and $P_I$ pairs provides a plurality of different $T_O$ Min, $T_O$ Max and total power loss values for a given potential continuously variable transmission operating range state from which $N_I$ and $P_I$ pairs from each potential continuously variable transmission operating state. The method is repeated for each potential transmission operating range state and a plurality of $T_O$ Min, $T_O$ Max, and total power loss values are generated in the space S of and for each potential transmission operating range state and $N_I$ and $P_I$ pairs provided.

From such plurality of different $T_O$ Min and $T_O$ Max values so generated by a search engine for a given potential transmission operating range state, the $N_I$ and $P_I$ pair having the highest $T_O$ Max value associated with each potential transmission operating range state is biased to be selected as the preferred $N_I$ and $P_I$, to reduce biasing costs associated with the output torque request in FIG. 19, which is one of the multiple components in the total power loss, when an operator torque request is greater than the plurality of different $T_O$ Max values generated. For cases in which an operator torque request is less than the plurality of different $T_O$ Min generated, the $N_I$ and $P_I$ pair associated with the lowest $T_O$ Min value is biased to be selected as the preferred $N_I$ and $P_I$ to reduce biasing costs associated with the output torque request in FIG. 19, which is one of the multiple components in the total power loss for the particular potential transmission operating range state under consideration. The hybrid Engine-Off state can be considered as continuously variable modes with the $N_I$ and $P_I$ as being zero; thus, $T_O$ Min, $T_O$ Max, and the total power loss are determined without the need for a search procedure.

In the case of Fixed Gear range states, a search engine suitable for such a method employs, for each potential transmission operating range state, a space that is defined by the region on the coordinate axes bounded by $T_I$ Min, and $T_I$ Max, wherein $T_I$ represents torque inputted to the electro-mechanical hybrid transmission where the transmission input speed is pre determined by the hardware parameter of potential transmission operating range state. The search engine selects, either randomly or according to any desired algorithm, an $T_I$ present in the search range and calculates a $T_O$ Min and $T_O$ Max and Total Power Loss associated with the $T_I$ chosen, based on drivetrain system component power losses and operating constraints, which constraints are either inherent in the system, or imposed by vehicle engineers. Repetition of this method for a large number of different $T_I$ provides a plurality of different $T_O$ Min and $T_O$ Max and Total Power Loss values for a given potential transmission operating range state. The method is repeated for each potential transmission operating range state and a plurality of $T_O$ Min and $T_O$ Max and Total Power Loss are generated in the search range of and for each potential transmission operating range state and $T_I$ is provided.

From such plurality of different $T_O$ Min and $T_O$ Max values so generated by a search engine for a given potential transmission operating range state, the $T_I$ having the highest $T_O$ Max value associated with each potential transmission operating range state is biased to be selected as the preferred $T_I$, when an operator torque request is greater than the plurality of different $T_O$ Max generated. This reduces biasing costs associated with the output torque request in FIG. 19, which is one of the components in the total power loss for the particular potential transmission operating range state under consideration. For cases in which an operator torque request is less than the plurality of different $T_O$ Min generated, the $T_I$ associated with the lowest $T_O$ Min value is biased to be selected as the preferred $T_I$ to reduce biasing costs associated with the output torque request in FIG. 19, which is one of the components in the total power loss for the particular potential transmission operating range state under consideration.

In one embodiment, including when a vehicle operator makes a request for an acceleration torque that is greater than the maximum deliverable output torque, following generation of a plurality of engine operating points ($N_I$ and $P_I$ pairs for continuously variable modes and $T_I$ for fixed gears) for each potential transmission operating range state, which engine operating points ($N_I$ and $P_I$ pairs for continuously variable modes and $T_I$ for fixed gears) each have associated with them a $T_O$ Min, $T_O$ Max, and total power loss values, the desired transmission operating range state is determined by comparing the points associated with the selected engine operating points ($N_I$ and $P_I$ pairs for continuously variable modes and $T_I$ for fixed gears) from each potential transmission operating state with one another, and selecting that operating range state having the least total power loss associated with its point biased to the highest $T_O$ Max value, which corresponds to the least value of x in FIG. 20.

In another embodiment, including when a vehicle operator makes a request for a deceleration torque that is less than the minimum deliverable output torque, following generation of a plurality of engine operating points ($N_I$, $P_I$ pairs for continuously variable modes and $T_I$ for fixed gears) for each potential transmission operating range state, which engine operating points ($N_I$, $P_I$ pairs for continuously variable modes and $T_I$ for fixed gears) each have associated with them a $T_O$ Min, $T_O$ Max, and total power loss values, the desired transmission operating range state is determined by comparing the points associated with the selected engine operating points ($N_I$ and $P_I$ pairs for continuously variable modes and $T_I$ for fixed gears) from each potential transmission operating state which have the least total power loss with one another and selecting that operating range state having the least total power loss associated with its point biased to having the lowest $T_O$ Min value (corresponding to the least value of y in FIG. 20).

In one embodiment, determination of the total power loss associated with vehicle operation at a point associated with or identified by an engine operating point ($N_I$ and $P_I$ pair for continuously variable modes and $T_I$ for fixed gears) in a potential operating range state of the transmission comprises combining operating costs, in terms of energy usage (kW), which operating costs are provided based upon factors related to vehicle drivability, fuel economy, emissions, electrical power consumption and battery life for the operating range state. Lower operating costs are generally associated with lower fuel consumption at high conversion efficiencies, lower battery power usage, and lower emissions for an operating point, and take into account a current operating range state of the powertrain system.

Summation of all power losses (total power loss) associated with operating at a particular point that is associated with an engine operating point ($N_I$, $P_I$ pair for continuously variable modes and $T_I$ for fixed gears) of a potential transmission operating range state provides a preferability factor (including without limitation, those shown in FIG. 10) for operating at that particular point in the particular potential transmission operating range state under consideration. In the case when the operator torque request is greater than the torque deliverable by the driveline system, the point associated with an engine operating point ($N_I$, $P_I$ pairs for continuously variable modes and $T_I$ for fixed gears) in the respective search space S or range associated with a potential transmission operating range state may be selected to be biased to a point at which the maximum output torque ($T_O$ Max) of the transmission occurs for that potential transmission operating range state. Depending on the severity of the bias cost associated with the operator torque request, the selected point may or may not be that at which the maximum output torque occurs. Since the point selection is based on minimizing the total power loss where the bias cost associated with the output torque request is a component of, the larger the bias costs associated with the output torque request the greater is the advantage of selecting the point at which the maximum output torque of the transmission occurs. The search space S or range for each potential transmission operating range state may be examined, such as by algorithm, and the point associated with an engine operating point ($N_I$, $P_I$ pair for continuously variable modes and $T_I$ for fixed gears) at which the maximum output torque ($T_O$ Max) of the transmission is biased to occur identified for each potential transmission operating range state. The points associated with the engine operating point ($N_I$, $P_I$ pair for continuously variable modes and $T_I$ for fixed gears) at which the maximum output torque ($T_O$ Max) of the transmission is biased to occur for each potential transmission operating range state are compared with one another to identify the potential transmission operating range state having the lowest power loss that is likely to have the highest $T_O$ Max, which potential transmission operating range state is selected as being the best transmission operating range state when a vehicle operator makes a request for an acceleration torque, which is a torque request that tends to deliver more torque to the vehicle drive wheel(s) that are in contact with the road surface.

Similarly, in the case when the operator torque request is less than the torque deliverable by the driveline system, the point associated with an engine operating point ($N_I$, $P_I$ pair for continuously variable modes and $T_I$ for fixed gears) associated with a potential transmission operating range state may be selected to be biased to a point at which the minimum output torque ($T_O$ Min) of the transmission occurs for that potential transmission operating range state. Depending on the severity of the bias cost associated with the operator torque request, the point selected may or may not be that at which the minimum output torque occurs. Since the point selection is based on minimizing the total power loss where the bias cost associated with the output torque request is a component of, the larger the bias costs associated with the output torque request the more advantage there is to selecting the point at which the minimum output torque of the transmission occurs. The search space S, or range for each potential transmission operating range state may be examined, such as algorithmically using a microprocessor, and the point associated with an $N_I$ and $P_I$ pair at which the minimum output torque ($T_O$ Min) of the transmission is biased to occur identified for each potential transmission operating range state. The points associated with the engine operating point ($N_I$, $P_I$ pair for continuously variable modes and $T_I$ for fixed gears) at which the minimum output torque ($T_O$ Min) of the transmission is biased to occur for each potential transmission operating range state are compared with one another to identify the potential transmission operating range state having the lowest total power loss which is likely to have the lowest $T_O$ Min, which potential transmission operating range state is selected as being the best transmission operating range state when a vehicle operator makes a request for an deceleration torque, which is a torque request that tends to deliver less torque to the vehicle drive wheel(s) that are in contact with the road surface.

According to one embodiment of this disclosure, for cases of operator torque requests which command heavy vehicle acceleration (levels of acceleration for which the operator torque request is greater than that deliverable by the driveline system and the pre-determined bias cost associated with the output torque request is severe enough to overrule all other components of the total power loss), determining the engine operating point ($N_I$, $P_I$ pair for continuously variable modes and $T_I$ for fixed gears) having the least power loss associated with them automatically results in determination of the $N_I$ and $P_I$ pair having the $T_O$ Max, because the engine operating point ($N_I$, $P_I$ pair for continuously variable modes and $T_I$ for fixed gears) having the highest $T_O$ Max values associated with it, also has the smallest power losses associated with it. The converse is true for cases of operator torque requests which command vehicle deceleration.

Hence, in a method according to an embodiment of the disclosure, an operator torque request is made during operation of a vehicle equipped with a system as herein described. A search engine embedded in an on-board microprocessor chooses a first engine operating point ($N_I$, $P_I$ pair for continuously variable modes and $T_I$ for fixed gears) from the search space S or range associated with a potential transmission operating range state. $T_O$ Max and $T_O$ Min values associated with that engine operating point ($N_I$, $P_I$ pair for continuously variable modes and $T_I$ for fixed gears) in the search space S or range are calculated. Then, the power losses associated with that engine operating point ($N_I$, $P_I$ pair for continuously variable modes and $T_I$ for fixed gears) in the respective search space S or range are calculated. As part of the total power loss calculation, the difference between the operator torque request and the $T_O$ Max (or $T_O$ Min, as may be applicable for cases where deceleration torque is requested) is assigned a biasing cost. This process is repeated for each engine operating point ($N_I$ and $P_I$ pair for continuously variable modes and $T_I$ for fixed gears) in the space S or range chosen by the search algorithm associated with that potential transmission operating range state, which results in a cost being associated with each chosen engine operating point ($N_I$, $P_I$ pair for continuously variable modes and $T_I$ for fixed gears) in the respective search space S or range associated with that potential transmission operating range state. The points having the lowest biasing costs are inherently inclined to have the highest $T_O$ Max and lowest $T_O$ Min values.

Thus, a method according to the disclosure is concerned with balancing selection of a transmission operating range state from a set of potential transmission operating range states between choosing engine operating point ($N_I$, $P_I$ pair for continuously variable modes and $T_I$ for fixed gears, with emphasis on the $N_I$ value, which is used for creating a desired transmission input profile as earlier described herein) in the respective search space S or range which have the least power losses of the system associated with each potential transmission operating range state, which includes a bias cost that biases the point selection to a point which has the highest $T_O$ Max, (or lowest $T_O$ Min). Preference in some embodiments may be given to those engine operating point ($N_I$, $P_I$ pair for continuously variable modes and $T_I$ for fixed gears) within the respective search space S or range for the various potential transmission operating range states which have the absolute least total power losses, which includes large bias costs associated with the output torque request, which in such instance is more concerned with meeting an extreme torque request from the vehicle operator. In other embodiments, preference may be given to those engine operating points ($N_I$, $P_I$ pairs for continuously variable modes and $T_I$ for fixed gears) within the respective search space S or range for the various potential transmission operating range states which have the absolute least total power losses, which include none or small bias costs associated with the output torque request, as this is an instance wherein it is desired to focus less on attempting to meet the extreme torque demand of the driver, and more on overall system efficiency. The choice between whether preference is given to system performance to meet the extreme torque demand as closely as possible, or to maximize the overall system efficiency is controllable by altering the function which determines the shape of the biasing cost curve shown in FIG. 19. When the slope of the curve defined by the function therein is selected to be steeper, more weight is given to meeting the operator torque request that is higher or lower than the torque output deliverable by the driveline.

Once a method of the disclosure has been used to identify which potential transmission operating range state is to be selected, the transmission input speed $N_I$ that was the basis for the selection of that particular transmission operating range state is used as the transmission input speed for continuously variable modes.

Figure 22:
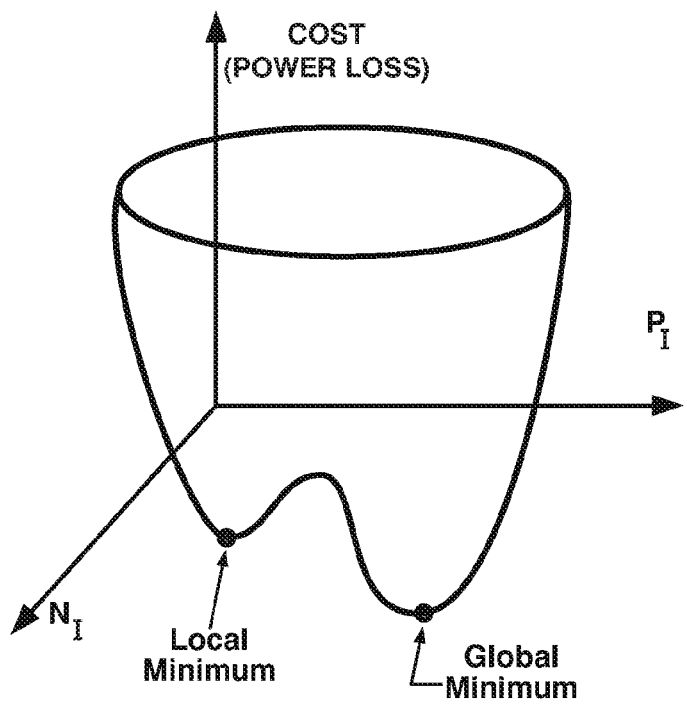
FIG. 22 is a 3-dimensional graphical representation of a hypothetical cost function, in accordance with the present disclosure.

It has been demonstrated that an operating point described by a particular $N_I$, $P_I$ pair is caused to be selected from a search range space in view of power losses associated with one or more cost functions, for the case of operation in modes such as M1 and M2. However, it may in certain instances, depending on the structure of the cost function(s) employed and operating conditions encountered, be possible that the search method fails to converge to the $N_I$, $P_I$ pair associated with the lowest total power loss. For example, in some instances this may be due to the nature of the costing functions and operating conditions, eddies or areas on the cost function curve(s) having local minima may cause an iterative search method using a search engine as herein described to zero-in on one $N_I$, $P_I$ pair associated with a local minimum associated with a power loss that is greater than that of the global minimum, such as that shown in exemplary FIG. 22, instead of the global minimum that is defined by a different $N_I$, $P_I$ pair. In such instances it may be considered that the search for an appropriate $N_I$, $P_I$ pair has then failed, which failure may become problematic with regards to stable operation of an electro-mechanical transmission as provided herein. However, even for some cases where the search does not so "fail" it may be desirable to ensure that the $N_I$ value that is chosen has good subjective appeal to the operator. For instance, it might be that in some instances when a person who is operating a vehicle equipped with a driveline as herein described depresses the accelerator pedal, that an $N_I$ value is chosen which is lower than that which was in use prior to the depression of the accelerator pedal. In general, vehicle operators are accustomed to hearing a vehicle engine increase in rpm when they depress an accelerator pedal and hearing or sensing a decrease in $N_I$ in particular instances may provide an undesirable, un-natural feeling to a vehicle operator, which situation is desirably avoided.

Figure 23:
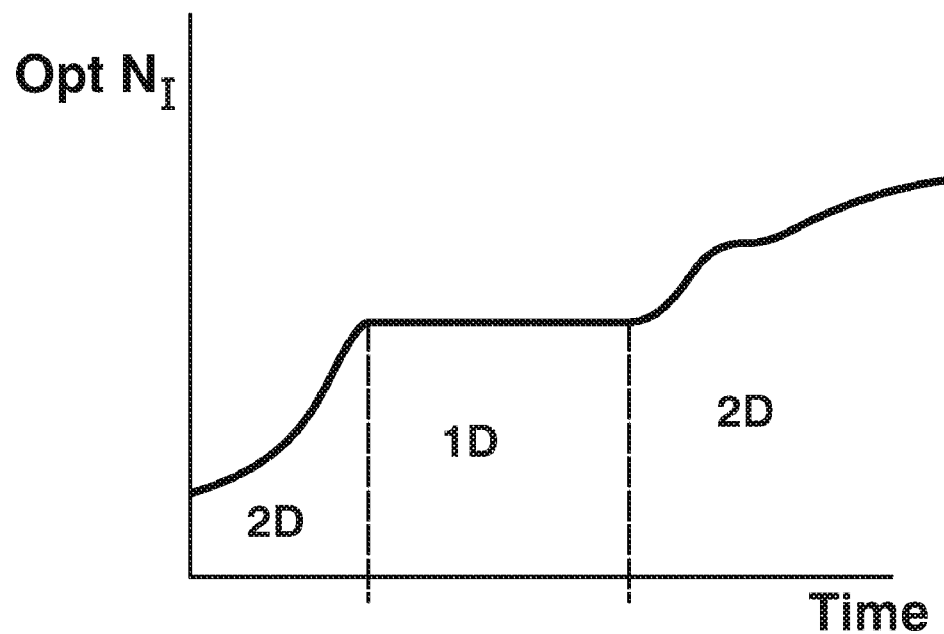
FIG. 23 is a profile of how transmission input speed over time might appear, in accordance with the present disclosure.

In one embodiment a method as provided herein examines $N_I$ values from a previous iteration of the search engine and makes a determination of whether a prior $N_I$ value is more desirable, in terms of power loss, than a newly-generated $N_I$ value from the search engine. For those cases where it is found that the search "failed", the prior $N_I$ value may be chosen by Arbitration over the newly-generated $N_I$ value, causing the general shape of the graph of the $N_I$ value over time to appear as shown in FIG. 23, being constant over the region(s) where the search fails and the 1-dimensional (1D) search engine predominates the 2-dimensional (2D) search engine results. In general, the Arbitration will examine the output of the 1D and 2D search engines and choose that output having the least power loss associated with it.

In other embodiments, input speed ($N_I$) stabilization is enhanced by adding a cost to the existing cost function(s) or providing a separate cost function which stabilizes $N_I$ to the position of the vehicle accelerator pedal.

The disclosure provides an improved value for $N_I$ in those cases where the search fails, by considering the rate of change of the input speed ($N_I$) expressed as $d(N_I)/dt$. In one embodiment, an improved $N_I$ value is provided the equation:

$$\text{new } N_I = \text{old } N_I + [d(N_I)/dt](dt) \quad [4]$$

Figure 24:
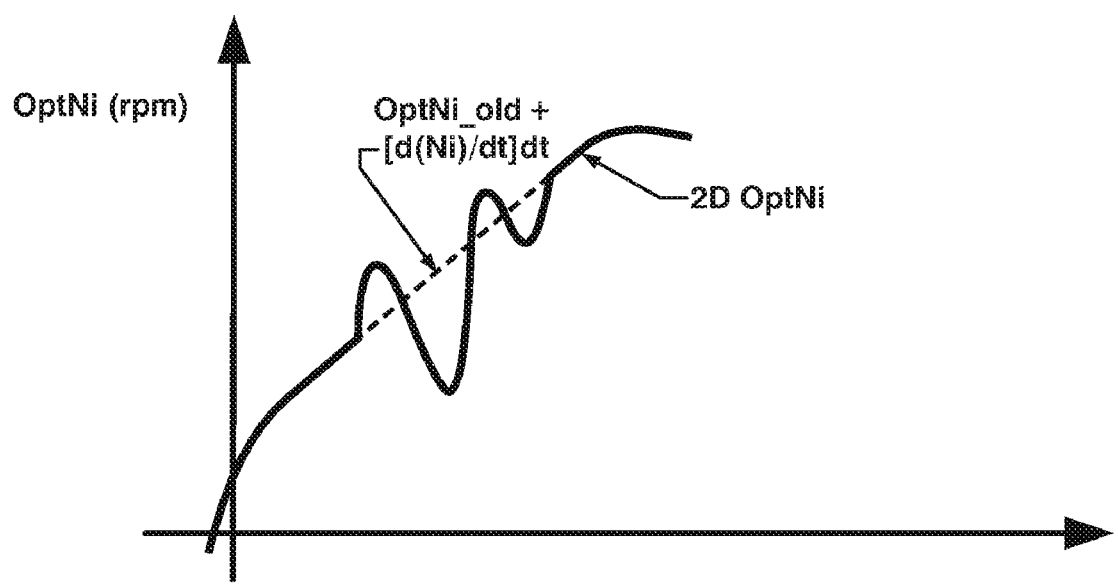
FIG. 24 illustrates a smoothing effect in the transmission input speed over time, in accordance with the present disclosure.
Figure 25:
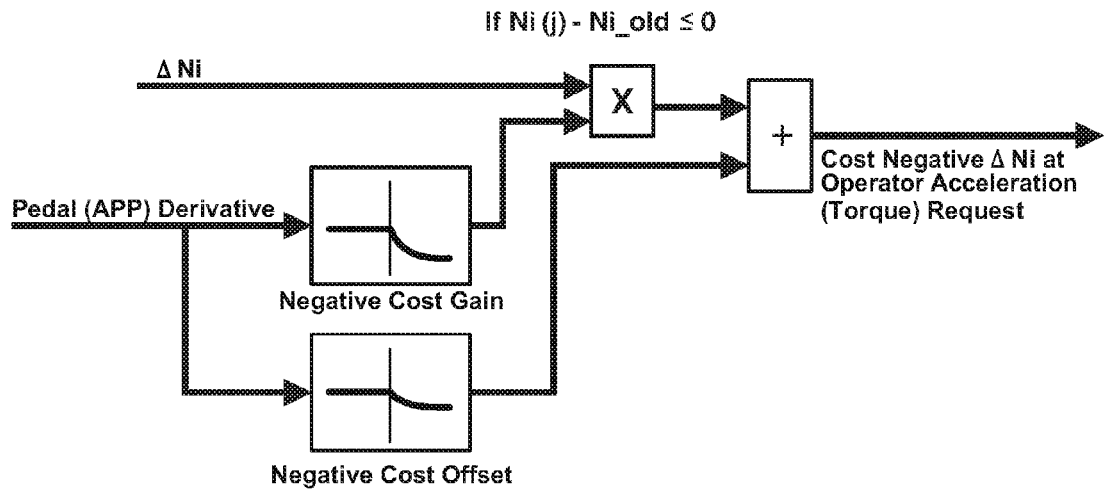
FIG. 25 is a flow chart showing processing of data relating to the accelerator pedal position to provide a biasing cost, in accordance with the present disclosure.

(wherein "old $N_I$" refers to the $N_I$ selected from the previous search, and $d(N_I)/dt$ refers to the optimal input speed change rate which are predetermined parameters which are dependent on the operator torque request and driving conditions. These parameters represent a desired optimal input speed change rate and may be based on simulated results of the 2D search process for various operator torque requests and driving conditions) and the $N_I$/time profile is also manipulated, based on accelerator pedal position by adding costs for those situations in which the $N_I$ profile over time is moving in a direction which is deemed undesirable, based on subjective features determined by the vehicle engineers. This has the net effect of costing, and hence making less favorable from the standpoint of selection, undesirable movements in the $N_I$ profile over time. Thus, according to a general case as provided herein, the trajectory of the input speed that is chosen to be most desirable, which may be called Opt $N_I$, is stabilized by replacing the 2-dimensional search optimal input speed (2D Opt $N_I$) with the sum of the optimal input speed from the previous loop (Opt $N_I$ old) and the optimal input speed change rate, multiplied by the time interval between search loops $[d(N_I)/dt](dt)$, as shown pictorially in FIG. 24, in which the following equalities apply:

$$2D \text{ Opt} N_I = 2D N_I^* \quad [5]$$

$$1D \text{ Opt} NI = 1D NI^* \quad [6]$$

$$2D \text{ OptPwrLoss} = 2D P\text{Cost}^* \quad [7]$$

$$1D \text{ OptPwrLoss} = 1D P\text{Cost}^* \quad [8]$$

in which Opt$N_I$ is the Arbitrated $N_I^*$, and OptPwrLoss is the Arbitrated PCost*). With reference to FIG. 25, one exemplary algorithm useful for determining $N_I$ is:

```
If      2D OptCost > 1D OptCost (*)
        OptNi = OptNi_old + [d(N_I)/dt] (dt)
        OptPwrLoss = 1D OptPwrLoss
Else
        OptNi = 2D OptNi
        OptPwrLoss = 2D OptPwrLoss –
                (Driver pedal filter derivative gain scheduling costing)(**)
End
``` in which the 2D Optimal Cost could have a higher cost than the 1D Optimal Cost due to a relatively high driver pedal filter derivative gain scheduling cost, or when the 2D Search fails to converge to the minimum optimal cost. Driver pedal filter derivative gain scheduling costing provides a cost the input speed change with respect to the driver pedal aggressiveness, i.e cost heavy decrease (increase) in input speed when the driver pedal is requesting aggressive acceleration (deceleration). This is included in the Cost Function in the 2D and 1D Optimization for Input Speed stabilization purposes, but subtracted from the total cost arbitration so that it would not affect the optimal range selection. This cost is always 0 in the 1D Optimization since Ni(j)=Ni_old.

In one embodiment, whether a movement in the $N_I$ profile over time is desirable or not is based on the position of the accelerator pedal. In another embodiment, whether a movement in the $N_I$ profile over time is desirable or not is based on the rate of change of position of the accelerator pedal. However, in general, it is undesirable that the $N_I$ value should decrease when the accelerator pedal is depressed substantially.

Referring now to FIG. 25 which illustrates a costing algorithm for negative $N_I$ changes (i.e., costing transmission input speed ($N_I$) points that have a lower value than the selected $N_I$ value from the prior search) the derivative of pedal position is along the x-axis in the gain and offset functions. When the derivative of the pedal position is negative, the cost gain and offset, which are the y-axis values of the cost gain and offset functions, are zero. This includes the case when the operator removes their foot from the accelerator pedal.

On the other hand, if the derivative of pedal position is positive, such as when the vehicle operator depresses the accelerator pedal, then the cost gain and offset functions will not be zero, but will be given by:

$$\text{Accel. Pedal Stabilizing Cost} = [(\text{negative gain})^* (\Delta N_I)] + \text{neg. offset value} \quad [9]$$

These provisions ensure, in general, that if the $N_I$ value is decreasing with time at a given instant, costing will only occur when the operator depresses the accelerator pedal.

Figure 26:
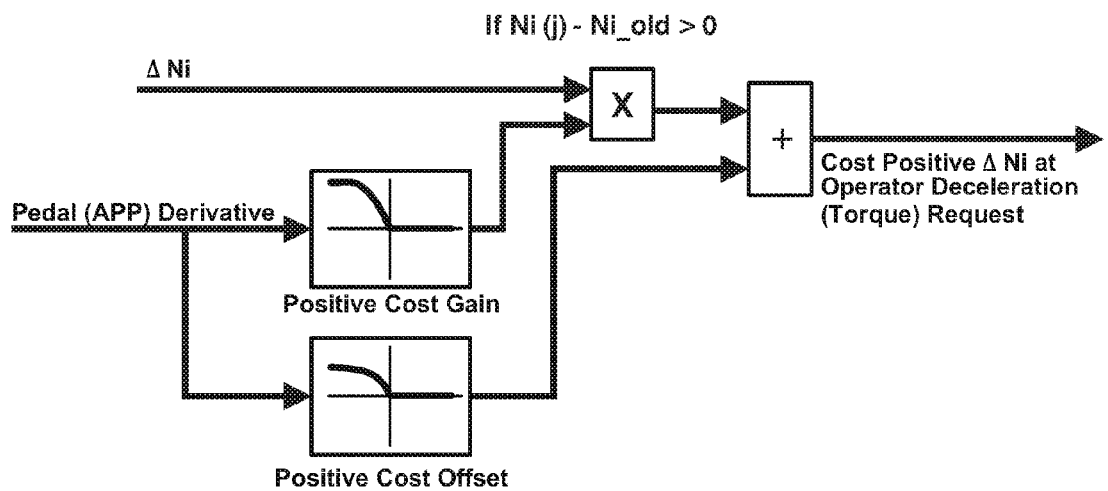
FIG. 26 is a flow chart showing processing of data relating to the accelerator pedal position to provide a biasing cost, in accordance with the present disclosure.

Referring now to FIG. 26, illustrating the costing algorithm for positive $N_I$ changes, i.e., costing transmission input speed ($N_I$) points that have a higher value than the selected $N_I$ value from the prior search, the derivative of pedal position is along the x-axis in the gain and offset functions. When the derivative of the pedal position is positive, the cost gain and offset, which are the y-axis values of the cost gain and offset functions, are zero. This includes the case when the operator depresses the accelerator pedal. On the other hand, if the derivative of pedal position is negative, such as when the operator removes their foot from the accelerator pedal, then the cost gain and offset functions will not be zero, but will be given by the equation:

$$\text{Accel. Pedal Stabilizing Cost} = [(\text{positive gain})^* (\Delta N_I)] + \text{pos. offset value} \quad [10]$$

These provisions ensure, in general, that if the $N_I$ value is increasing with time at a given instant, this type of costing will only occur when the operator removes their foot from the accelerator pedal. The negative, positive gain and offset values are subjective to the vehicle engineer, to enable latitude in providing enhanced drivability versus vehicle performance or economy.

In one embodiment, the processes described by FIGS. 25 and 26 are embedded in the cost functions (450) of the 1D and 2D process 610, 620, as shown and described in reference to FIGS. 6 and 8, and are but one of a plurality of costs provided by cost functions and algorithms resident in those processes, and are conducted only with regards to that operating range state which is currently selected. Thus, the process involving stabilization of the $N_I$ values as a function of pedal position is not considered as a factor in selection of which transmission operating range state is to be selected at a given time given particular operator torque requests or operating parameters, including road conditions. In one embodiment, when preferability factors are determined for purposes of determining transmission operating range state selection, the costs associated with stabilization of $N_I$ are subtracted out from the total costs used in determining the preferability factors, as earlier described herein.

Important aspects of operation of a motorized vehicle comprising a drivetrain as herein described include situations in which the operator of the vehicle provides a negative torque request, e.g., desires to apply braking. It is desirable in general to provide stable vehicle operation during times when braking torques are requested, and provision for such stability must take into consideration how the selection of transmission operating range state and transmission input speed are to be carried out during braking conditions.

During one non-limiting example of a braking situation, when predicted accelerator output torque request ('Accel Prdtd') is zero and the predicted braking output torque request ('Output Torque Request Brake Prdtd') is, for example, $-1000$ Newton*meters (Nm), the torque output (To) from the ('Opt To/Ta/Tb') function 440 could potentially be any value between zero and $-1000$ Nm, if these values reside within the $T_O$ Min and $T_O$ Max. This is in contrast to a conventional braking system, in the presence of a braking output torque request of $-1000$ Nm, when the accelerator output torque request is zero, the sum of zero and $-1000$ Nm needs to be provided by the friction brakes. Stated another way, in a vehicle equipped with a drivetrain as herein described, there are two types of braking: 1) conventional friction braking; and 2) regenerative braking, which means that in the above example, friction braking and regenerative braking may each be individual components, in any desired or selected amount or proportion, to provide a sum total combination of $-1000$ Nm of braking torque.

According to embodiments of the present disclosure, two general braking strategies may be employed for a vehicle equipped with an electro-mechanical transmission described herein. In one embodiment, braking operation may be switched between a first general strategy and a second general strategy by means of a switch 605, which is activated in accordance with the vehicle calibrations.

In the first general strategy, both the transmission input speed ($N_I$) and the transmission operating range state selection are dependent on the braking torque request. A general schematic diagram of information processing in accordance with the first general strategy is shown in FIG. 7, for the case when the switch 605 is set so that the input to 610 is Ni*+[d($N_I$)/dt](dt) which includes full optimization of transmission input speed and transmission operating range state selection in strategic optimization, while accounting for blended braking, involving both friction-pad braking and the use of resistive torque from electric machines 56 and 72 which generate electrical energy during the course of their being in operative connection with one or more of the vehicle wheels during such braking, the electrical energy so produced being stored in the ESD 74. In this strategy, the 1D optimization 610 is executed in parallel with the 2D optimization 620 during blended braking operations. The Optimal Output Torque (OptTo) function (which is a part of the Opt To/Ta/Tb function 440) and the Brake Power Loss Cost function are enabled in both 1D and 2D optimizations. Optimal Output Torque (OptTo) function selects an optimal output torque which is constrained by the achievable output torque limits, $T_O$ min and $T_O$ max, that minimizes the battery power ('PBat') within the range from the minimum Output Torque Request Net Strategic (Output Torque Request Accel Prdtd+Output Torque Request Brake Prdtd) to the maximum of To Req Prdtd (Output Torque Request Accel Strategic). Brake Power Loss Costing is added to the Cost function 450 to compensate for power lost through friction braking. This is caused to occur by the OptTo function selecting an Optimal Output Torque (OptTo) that is greater than the Output Torque Request Net Strategic. Thus, a braking torque request by the operator affects both the optimal input speed and the optimal range selection.

As previously mentioned, it is possible in some instances for the 2D search to fail to converge to an $N_I$, $P_I$ pair associated with the lowest total power loss, or for there to exist relatively high power losses (change costs) associated with an undesirable change in $N_I$, in which case it is desirable to stabilize the 2D Ni* values which are the outputs of the 2D optimization 620. Accordingly, in parallel with the 2D optimization, a 1D optimization 610 is conducted using a previous value for the optimal $N_I$ value Ni* and adding to it the change rate of the $N_I$ value, [d($N_I$)/dt](dt) as previously described, for which the system provides a new d($N_I$)/dt every time the search is made. The new summed value is used as an input in a 1D optimization to arrive at a value for $T_I$ which gives the most desirable total power loss. Then, a new quantity becomes a part of the cost function sum (total power loss) of the 1D search, which sum cost is compared to the cost output from the 2D search. Thus, according to a first strategy the 1D search exists for the purpose of stabilizing what would otherwise be an undesirable output, if the 2D search output was the only output present.

In such a first general strategy, information sent to an Arbitration decision step is the lowest total power loss (P*cost) and optimal $N_I$ from the 2D search results, and the lowest total power loss (P*cost) from the 1D search results and previous value for the optimal $N_I$ value added to [d($N_I$)/dt](dt). The Arbitration selects the optimal $N_I$ and P*Cost as values upon which to base selection of an optimal transmission operating range state ('Hybrid Range State Des') (P*cost selected from 2D or 1D) and select input speeds associated with the selected P*cost, to be used as a basis for determining an optimal or desired transmission input speed ('Ni_Des') profile.

In a second general strategy, only the transmission operating range state selection is dependent on the braking torque request ('Output Torque Request Brake Prdtd'), with the transmission input speed $N_I$ being unaffected by the braking torque request of the operator. Thus, in a second general strategy, selection of $N_I$ ignores the operator brake torque request and bases the $N_I$ chosen on the position of the accelerator pedal ('Output Torque Request Accel Prdtd'). A general schematic diagram of information processing in accordance with the second general strategy is shown in FIG. 7, when the switch 605 is set so the input to 610 is 2D Ni* and does not involve transmission input speed stabilization. In this strategy, the 1D optimization is executed in series with the 2D optimization during a blended braking operation, which effectively disables transmission input speed stabilization. The 1D Opt $T_O$ function and brake power loss Cost is enabled and the 2D Opt $T_O$ function is partially disabled so that Opt $T_O$ will always be equal to the Output torque Request Accel Prdtd, that is limited by the achievable output torque ($T_O$ min, $T_O$ max), with brake power loss costing disabled, and therefore the 2D optimal input speed will not account for the braking effect. The braking will effect the optimal range selection through the 1D P*cost resulting from incorporating braking input data in the 1D optimization, but not the input speed selection. This has one effect of avoiding driver discomfort by preventing sudden changes in engine speed at braking events.

In the case of the second general strategy, when the operator of the vehicle makes a braking torque request, such as by applying the brake pedal, it is not desired to have any effects from braking to impact the engine speed, and by ignoring the brake torque request in the 2D search a transmission input speed $N_I$ is obtained that is unaffected by the operator brake torque request (Output Torque Request Brake Prdtd). In this strategy, the 1D optimization needs an Opt $N_I$ value, and for this, the output of the 2D optimization is used. Accordingly, the selection of $N_I$ is done without braking input data.

In the second general strategy, the information sent to Arbitration is the lowest total power loss (P*cost) from the 1D search engine and the optimal $N_I$ from the 2D search engine, and Arbitration selects the P*cost from the 1D search engine results and the optimal $N_I$ from the 2D search engine results as values upon which to base range selection ('Hybrid Range State Des') on (P*cost from 1D) and to select an input speed to be used as a basis for determining an optimal or desired transmission input speed (Ni_Des) profile.

The difference of (Opt $T_O$–Output Torque Request Net Strategic) represents unused torque or brake power loss, which may be multiplied by $N_O$ to convert to power units and used as a cost to be combined with other power losses (costs) in determining total power loss.

Although the foregoing strategies are descriptive of selection of operating parameters in continuously variable modes of the electro-mechanical transmission, these same Optimal Output Torque (Opt $T_O$) function and braking power losses are included also in the cost functions for fixed gear operation and engine-off modes. Since the transmission input speed is predetermined for fixed gear operations and engine-off modes, the Opt $T_O$ function and the brake power loss functions are enabled only to determine the P*Cost values for each potential operating range upon which to base selection of transmission operating range state ('Hybrid Range State Des').

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for operating a motorized vehicle having a powertrain system that includes an engine coupled to an electro-mechanical transmission selectively operative in one of a plurality of transmission operating range states and one of a plurality of engine states, an accelerator control, and an electrical energy storage device comprising:
    determining a transmission input speed having an associated first power loss;
    operating said transmission using said transmission input speed;
    providing a braking torque request having an associated second power loss and only in response to an operator depressing a brake pedal to cause blended braking of said vehicle according to a scheme selected from the group consisting of a first braking mode and a second braking mode, said blended braking comprising a sum of friction braking and regenerative braking using resistive torque from at least one electric machine, wherein the sum of said friction braking and said regenerative braking provides a combination that achieves the braking torque request and biasing the value of at least one of the said first power loss and said second power loss based on said braking torque request;
    wherein said transmission input speed and said transmission operating range state are dependent on said braking torque request in said first braking mode, and wherein said transmission operating state, but not said transmission input speed, is dependent on said braking torque request in said second braking mode.

2. A method according to claim 1 wherein transmission input speed is substantially unaffected by said braking torque request.

3. A method according to claim 1 wherein selection of said transmission operating range state is made based at least in part on the magnitude of said braking torque request.

4. A method according to claim 1 wherein said transmission input speed is one which yields a torque output of said transmission that provides a maximal level of charging of said electrical energy storage device relative to other potential transmission input speeds immediately subsequent to provision of said braking torque request.

5. A method according to claim 1 wherein said transmission input speed is one which yields a torque output of said transmission that provides a less than maximal level of charging of said electrical energy storage device relative to other potential transmission input speeds immediately subsequent to provision of said braking torque request.

6. A method according to claim 1 wherein said friction braking is caused as a result of the blending of forces from friction brake pads contacting a brake rotor and said regenerative braking is provided by the at least one electric machine present in said electro-mechanical transmission during charging of said electrical energy storage device.

7. A method according to claim 1 wherein the transmission input speed determined is based solely on the position of said accelerator control.

8. A method according to claim 7 wherein said braking torque request is ignored when determining said transmission input speed.

9. A method according to claim 1 wherein the determined transmission input speed is dependent upon the selected operating range state of the transmission.

10. A method according to claim 9 wherein the determined transmission input speed is different for each potential transmission operating range state, given the same braking torque request.

11. A method for improving drivability of a powertrain system having a braking control and including an engine coupled to an electro-mechanical transmission selectively operative in one of a plurality of transmission operating range states and one of a plurality of engine states, comprising:

determining a first transmission input speed, said first transmission input speed having a first power loss associated with it;

operating said transmission using said first transmission input speed;

determining an operational parameter relating said braking control;

determining a second transmission input speed responsive to said operational parameter, said second transmission input speed having a second power loss associated with it;

biasing the value of at least one of said first power loss and said second power loss, based on said operational parameter;

comparing said first power loss to said second power loss subsequent to said biasing;

determining a third transmission input speed; and operating said transmission using said third transmission input speed.

12. A method according to claim 11 wherein said operational parameter is the position of said braking control.

13. A method according to claim 11 wherein said determining a third transmission input speed is based on the comparison of said first power loss to said second power loss subsequent to said biasing.

14. A method according to claim 11 in which said third transmission speed is greater than said second transmission speed by an amount equal to about the product of the change rate of the transmission input speed [d(transmission input speed)/dt] and a time differential [dt], in which dt is any amount of time between about one and about one thousand milliseconds, including all amounts of time and all intervals therebetween.

* * * * *